US012761804B2

(12) United States Patent
Choi et al.

(10) Patent No.: US 12,761,804 B2
(45) Date of Patent: Oct. 13, 2026

(54) METHOD OF OPERATING MEMORY SYSTEM AND MEMORY SYSTEM PERFORMING THE SAME

(71) Applicant: Samsung Electronics Co., Ltd., Suwon-si (KR)

(72) Inventors: Changho Choi, Suwon-si (KR); Young Bong Kim, Suwon-si (KR); Eun-Kyung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/170,582

(22) Filed: Apr. 4, 2025

(65) Prior Publication Data

US 2025/0231688 A1 Jul. 17, 2025

Related U.S. Application Data

(63) Continuation of application No. 18/485,719, filed on Oct. 12, 2023, now Pat. No. 12,287,971.

(30) Foreign Application Priority Data

Mar. 21, 2023 (KR) ........................ 10-2023-0036803

(51) Int. Cl.
*G06F 3/06* (2006.01)
*G06F 12/02* (2006.01)

(52) U.S. Cl.
CPC ............ *G06F 3/0613* (2013.01); *G06F 3/064* (2013.01); *G06F 3/0679* (2013.01); *G06F 12/0246* (2013.01); *G06F 2212/7205* (2013.01)

(58) Field of Classification Search
None
See application file for complete search history.

(56) References Cited

U.S. PATENT DOCUMENTS 5,933,840 A 8/1999 Menon et al.
10,275,349 B2 4/2019 Kim et al.
10,613,975 B2 4/2020 Jung et al.
10,776,268 B2 9/2020 Yoon et al.
(Continued)

FOREIGN PATENT DOCUMENTS

KR 10-2017-0044780 A 4/2017
KR 10-2017-0104286 A 9/2017
(Continued)

*Primary Examiner* — Nathan Sadler
(74) *Attorney, Agent, or Firm* — Fish & Richardson P.C.

(57) ABSTRACT

In a method of operating a memory system disclosed, whether a first condition is satisfied is determined. The first condition is associated with free blocks and garbage collection (GC) target blocks from among a plurality of memory blocks. In response to the first condition being satisfied, a size of a data sample associated with executions of a host input/output request and GC is adjusted. The data sample is generated based on the adjusted size of the data sample. The data sample includes a downscaled current valid page count (VPC) ratio and the first number of previous host input/output request to GC processing ratios. A current host input/output request to GC processing ratio is calculated based on the data sample. The host input/output request and the GC are performed based on the current host input/output request to GC processing ratio.

20 Claims, 17 Drawing Sheets

(56) References Cited

U.S. PATENT DOCUMENTS

| | | | | |
|---|---|---|---|---|
| 11,237,961 | B2 | 2/2022 | Byun | |
| 11,429,307 | B2 | 8/2022 | Choi | |
| 12,287,971 | B2 * | 4/2025 | Choi .................. | G06F 12/0246 |
| 2010/0318719 | A1 * | 12/2010 | Keays ................ | G06F 12/0246 711/E12.001 |
| 2016/0163381 | A1 | 6/2016 | Lee | |
| 2017/0109276 | A1 | 4/2017 | Lee | |
| 2019/0018768 | A1 | 1/2019 | Kim et al. | |
| 2019/0196966 | A1 | 6/2019 | Hwang et al. | |
| 2020/0042438 | A1 | 2/2020 | Yi et al. | |
| 2022/0261342 | A1 | 8/2022 | Yang | |
| 2023/0195344 | A1 | 6/2023 | Yoo et al. | |
| 2024/0069789 | A1 | 2/2024 | Oh et al. | |

FOREIGN PATENT DOCUMENTS

| | | | |
|---|---|---|---|
| KR | 10-2020-0142393 | A | 12/2020 |
| KR | 10-2021-0111527 | A | 9/2021 |
| KR | 102378295 | B1 | 3/2022 |
| KR | 10-2023-0094262 | A | 6/2023 |

* cited by examiner

| # of FBs | GC Levels |
|---|---|
| N1 | GC_LEV1 |
| N2 | GC_LEV2 |
| N3 | GC_LEV3 |
| N4 | GC_LEV4 |

METHOD OF OPERATING MEMORY SYSTEM AND MEMORY SYSTEM PERFORMING THE SAME

CROSS-REFERENCE TO RELATED APPLICATIONS

This application is a continuation of U.S. application Ser. No. 18/485,719, filed Oct. 12, 2023, which claims priority under 35 U.S.C. § 119 to Korean Patent Application No. 10-2023-0036803 filed on Mar. 21, 2023, in the Korean Intellectual Property Office, the disclosures of which are incorporated by reference herein in their entireties.

BACKGROUND

Embodiments of the present disclosure described herein relate to semiconductor devices, and more particularly, relate to operating methods of memory systems and memory systems performing the operating methods.

Nowadays, an electronic device including a plurality of memory systems each implemented, for example, with a solid state drive (SSD) is widely used in a data center. The memory system has the following advantages: excellent stability, excellent endurance, a very fast information access speed, and low-power consumption.

In the memory system that is used in the data center, system loads that the memory system takes depending on a plurality of tasks may be referred to as "workloads." The workloads may include host input/output requests and garbage collections (GCs). The host input/output requests and the GCs may be processed in a given manner, based on valid page count (VPC) ratios associated with GC target blocks targeted for the GCs. However, unexpected latencies may consistently occur in the process of performing the workloads in the given manner.

SUMMARY

Example embodiments of the present disclosure provide operating methods of memory systems capable of reducing latencies caused in the process of performing workloads in the memory systems.

Example embodiments of the present disclosure provide memory systems performing the method.

According to some example embodiments, in a method of operating a memory system, whether a first condition is satisfied is determined. The first condition is associated with free blocks and garbage collection (GC) target blocks from among a plurality of memory blocks. Each of the plurality of memory blocks includes a plurality of nonvolatile memory cells. In response to the first condition being satisfied, a size of a data sample associated with executions of a host input/output request and GC is adjusted. The data sample is generated based on the adjusted size of the data sample. The data sample includes a downscaled current valid page count (VPC) ratio for a current GC block from among the GC target blocks and a first number of previous host input/output request to GC processing ratios. A current host input/output request to GC processing ratio is calculated based on the data sample. The host input/output request and the GC are performed based on the current host input/output request to GC processing ratio.

According to some example embodiments, a memory system includes a plurality of memory blocks and a memory controller. The plurality of memory blocks include free blocks and garbage collection (GC) target blocks. Each of the plurality of memory blocks includes a plurality of memory cells. The memory controller determines whether a first condition is satisfied. The first condition is associated with the free blocks and the GC target blocks. The memory controller adjusts a size of a data sample associated with executions of a host input/output request and GC, in response to the first condition being satisfied. The memory controller generates the data sample based on the adjusted size of the data sample. The data sample includes a downscaled current valid page count (VPC) ratio for a current GC block from among the GC target blocks and a first number of previous host input/output request to GC processing ratios. The memory controller calculates a current host input/output request to GC processing ratio based on the data sample to issue one or more commands for the executions of the host input/output request and the GC. The memory controller includes an operating mode determiner, a GC task manager, and an input/output flow controller. The operating mode determiner determines whether the first condition is satisfied, adjusts the size of the data sample when the first condition is satisfied, and outputs the data sample of the adjusted size and the downscaled current VPC ratio. The GC task manager outputs a GC input/output request for performing the GC when the first condition is satisfied. The input/output flow controller generates the data sample based on the adjusted size of the data sample, calculates the current host input/output request to GC processing ratio based on the data sample, and issues an command for performing the host input/output request and the GC input/output request based on the current host input/output request to GC processing ratio.

According to some example embodiments, in a method of operating a memory system, operating mode information is generated. The operating mode information is generated by determining whether there is satisfied a first condition associated with free blocks and garbage collection (GC) target blocks from among a plurality of memory blocks and indicates one of a first operating mode and a second operating mode. Each of the plurality of memory blocks includes a plurality of memory cells. In the first operating mode, a size of a data sample associated with executions of a host input/output request and GC is reduced. The data sample including a downscaled current valid page count (VPC) ratio for a current GC block from among the GC target blocks and a first number of previous host input/output request to GC processing ratios is generated based on the reduced size of the data sample. A current host input/output request to GC processing ratio is calculated based on the data sample. The host input/output request and the GC are performed based on the current host input/output request to GC processing ratio.

BRIEF DESCRIPTION OF THE FIGURES

The above and other objects and features of the present disclosure will become apparent by describing in detail example embodiments thereof with reference to the accompanying drawings.

DETAILED DESCRIPTION

Below, example embodiments of the present disclosure will be described in detail and clearly to such an extent that one skilled in the art may easily carry out the present disclosure.

Figure 1:
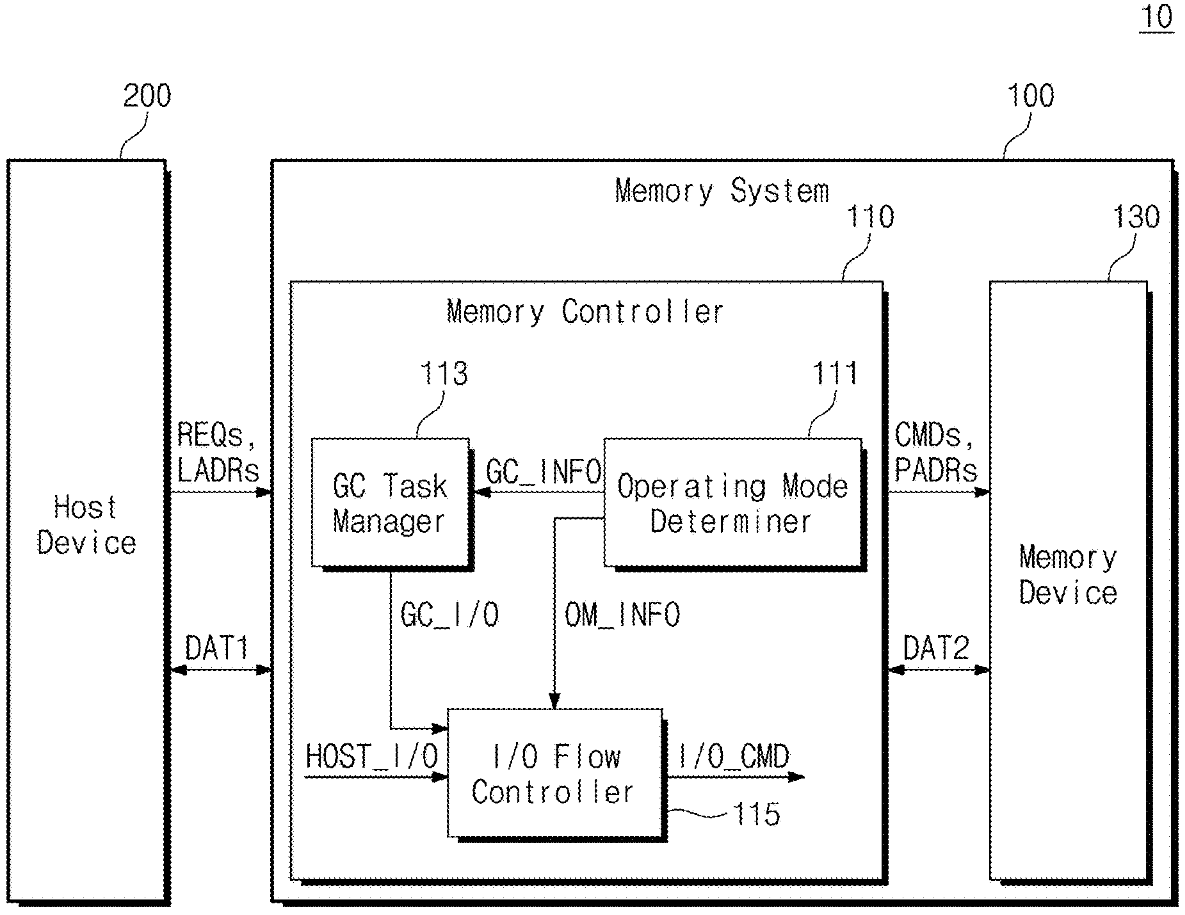
FIG. 1 is a block diagram illustrating an electronic device including a memory system according to some example embodiments of the present disclosure.

FIG. 1 is a block diagram illustrating an electronic device including a memory system according to some example embodiments of the present disclosure.

Referring to FIG. 1, an electronic device 10 may include a memory system 100 and a host device 200. The memory system 100 may include a memory controller 110 and a memory device 130.

The memory controller 110 may transmit one or more commands CMDs and one or more physical addresses PADRs to the memory device 130 and may transmit/receive pieces of data DAT2 corresponding to the one or more physical addresses PADRs and the one more commands CMDs to/from the memory device 130.

The memory controller 110 may generate the one or more commands CMDs and the one or more physical addresses PADRs, based on one or more requests REQs, one or more logical addresses LADRs, and/or data DAT1 or may internally generate the one or more commands CMDs and/or the one or more physical addresses PADRs. For example, when a write request for writing data in the memory device 130 or a read request for reading data from the memory device 130 is received from the host device 200, the memory controller 110 may generate the one or more commands CMDs and/or the one or more physical addresses PADRs, based on the one or more requests REQs and/or the one or more logical addresses LADRs from the host device 200. For example, when the memory controller 110 (or a flash translation layer (FTL) of the memory controller 110) intends to perform garbage collection (GC) for securing free blocks in the memory device 130, the memory controller 110 may internally generate the one or more commands CMDs and/or the one or more physical addresses PADRs. In this case, the requests REQs received from the host device 200 for the access to the memory device 130 may be referred to as a "host input/output request HOST_I/O", and requests that the memory controller 110 internally generates for the GC may be referred to as a "GC input/output request GC_I/O".

The memory device 130 may include a plurality of memory blocks. The memory controller 110 may manage the plurality of memory blocks such that the number of memory blocks having a specific/given type from among the plurality of memory blocks is prevented or reduced in likelihood from excessively decreasing to a given value or less. As such, unexpected latencies may be prevented or reduced from being consistently caused. In some example embodiments, the plurality of memory blocks may be non-volatile memory blocks. For example, each of the plurality of memory blocks may include nonvolatile memory cells. For example, the memory device 130 may be a NAND flash memory device, but the present disclosure is not limited thereto.

In some example embodiments, the memory controller 110 may control a "host input/output request to GC processing ratio" indicating a ratio of the number of times of processing (or a processing speed) of the host input/output request HOST_I/O to the number of times of processing (or a processing speed) of the GC input/output request GC_I/O during a specific time period such that the number of free blocks is prevented or reduced in likelihood from excessively decreasing to a given value or less. For example, there may be generated one or more host tokens, which are deducted one by one whenever one "host input/output request HOST_I/O" is performed, and one or more GC tokens, which are deducted one by one whenever one "GC input/output request GC_I/O" is performed. The host tokens and/or the GC tokens may be generated based on the "host input/output request to GC processing ratio." Additionally, one time period corresponding to the "host input/output request to GC processing ratio" may be defined as a time period from a point in time when the one or more host tokens and the one or more GC tokens are generated from a point in time when all the tokens are consumed (or deducted). For example, the one or more requests REQs may include the host input/output requests HOST_I/Os. When data are written in free blocks by processing the host input/output requests HOST_I/Os (e.g., the write requests), the total number of free blocks may decrease. When new free blocks are generated by processing of the GC input/output requests GC_I/Os, the total number of free blocks may increase. When the host input/output requests HOST_I/Os and the GC input/output requests GC_I/Os are processed together during the time period corresponding to the "host input/output request to GC processing ratio", the total number of free blocks may decrease (or may increase relatively slowly) by increasing the "host input/output request to GC processing ratio", and the total number of free blocks may increase (or may increase relatively quickly) by decreasing the "host input/output request to GC processing ratio".

A plurality of GC levels according to a change in the number of free blocks may be defined. The plurality of GC levels may include a "high risk level" or a "block level".

The "high risk level" may indicate a level at which when the number of free blocks decreases below a given value, the free blocks should be secured by first performing the GC input/output requests GC_I/Os and then performing the host input/output requests HOST_I/Os. The "block level" may indicate a level at which when the number of free blocks excessively decreases below the given value, the free blocks should be urgently secured by performing only the GC input/output requests GC_I/Os and blocking the host input/output requests HOST_I/Os. However, this is provided only as an example. In another example embodiment, the "high risk level" may indicate a level at which when a ratio of free blocks to all the memory blocks included in the memory device 130 decreases below a given ratio, the free blocks should be secured by first performing the GC input/output requests GC_I/Os and then performing the host input/output requests HOST_I/Os. Also, the "block level" may indicate a level at which when the ratio of free blocks to all the memory blocks included in the memory device 130 excessively decreases below the given ratio, the free blocks should be urgently secured by performing only the GC input/output requests GC_I/Os and blocking the host input/output requests HOST_I/Os. In this case, some or all of bad blocks, redundancy blocks, and parity blocks may be excluded from all the memory blocks for defining the "high risk level" and the "block level".

As the number of free blocks decreases, the number of free blocks may be close to the high risk level or the block level before reaching the high risk level or the block level; in this case, the memory controller 110 may in advance change the size of a data sample for calculating the "host input/output request to GC processing ratio". The size of the data sample may be associated with an acquisition speed for acquiring new free blocks in the memory device 130. As will be described with reference to FIGS. 9 and 10, in the case of changing the size of the data sample, the number of "previous host input/output request to GC processing ratios" included in the data sample may change. For example, as the size of the data sample decrease, the number of "previous host input/output request to GC processing ratios" included in the data sample may decrease. In general, as the number of "previous host input/output request to GC processing ratios" included in the data sample decreases, free blocks may be secured in the memory device 130 more quickly (or may be acquired relatively quickly).

By changing the size of the data sample, the memory controller 110 may make the "current host input/output request to GC processing ratio" corresponding to a current time period (e.g., a first time period) smaller than the "previous host input/output request to GC processing ratio" corresponding to a previous time period (e.g., a second time period before the first time period) such that the memory system 100 secures (or acquires) new free blocks more quickly in the current time period than in the previous time period. As the GC input/output requests GC_I/Os are first performed at the high risk level or the host input/output requests HOST_I/Os are blocked at the block level, unexpected latencies may be consistently caused. The memory controller 110 may in advance prevent or reduce in likelihood the number of free blocks from reaching the high risk level or the block level such that unexpected latencies may not be consistently caused.

To this end, the memory controller 110 may determine whether there is satisfied a first condition associated with free blocks and GC target blocks among the plurality of memory blocks; when the first condition is satisfied, the memory controller 110 may adjust the size of the data sample associated with executions of the host input/output request and the GC.

In some example embodiments, the first condition may be associated with whether to start (or trigger) the GC and whether to adjust the size of the data sample. For example, the first condition may be a determination condition for determining whether to enter an operating mode in which the number of times of processing (or a processing speed) of the GC increases compared to the host input/output request in a given time period by adjusting the size of the data sample while performing the GC.

When the first condition is satisfied, the memory controller 110 may generate the data sample including a downscaled current valid page count (VPC) ratio for a current GC block among the GC target blocks and the first number of previous host input/output request to GC processing ratios, based on the adjusted size of the data sample.

In some example embodiments, the number of previous host input/output request to GC processing ratios included in the data sample may be changed based on the adjusted size of the data sample.

The memory controller 110 may calculate a current host input/output request to GC processing ratio based on the data sample. The memory controller 110 may perform the host input/output request and the GC based on the current host input/output request to GC processing ratio.

The memory controller 110 may include an operating mode determiner 111, a GC task manager 113, and an input/output flow controller 115.

The operating mode determiner 111 may determine whether the first condition is satisfied. When the first condition is satisfied, the operating mode determiner 111 may adjust the size of the data sample; when the first condition is not satisfied, the operating mode determiner 111 may not adjust the size of the data sample. The operating mode determiner 111 may output operating mode information OM_INFO indicating one of a first operating mode and a second operating mode to the input/output flow controller 115 and may output GC information GC_INFO to the GC task manager 113. The operating mode information OM_INFO may include the size of the data sample and a downscaled current VPC ratio, and the GC information GC_INFO may include addresses of GC target blocks and pieces of information related to GC executions.

In some example embodiments, in the first operating mode, the data sample may include the downscaled current VPC ratio and the first number of previous host input/output request to GC processing ratios; in the second operating mode, the data sample may include the downscaled current VPC ratio and the second number of previous host input/output request to GC processing ratios. As described above, the number of previous host input/output request to GC processing ratios included in the data sample may be changed in the first and second operating modes.

The GC task manager 113 may output, to the input/output flow controller 115, the GC input/output request GC_I/O for performing the GC when the first condition is satisfied.

The input/output flow controller 115 may generate the data sample based on the size of the data sample, may calculate the current host input/output request to GC processing ratio based on the data sample, and may issue a command I/O_CMD for the execution of the host input/output request HOST_I/O and the GC input/output request GC_I/O based on the current host input/output request to GC processing ratio. In this case, the command I/O_CMD may be included in the command I/O_CMD that the memory controller 110 issues to the memory device 130.

According to the above configuration, a memory system according to some example embodiments of the present disclosure may determine an operating mode of the memory system depending on whether there is satisfied a specific condition (e.g., the first condition) associated with free blocks and GC target blocks, and may change the size of the data sample for calculating a "host input/output request to GC processing ratio" associated with the number of times of processing (or a processing speed) of host input/output requests and GC input/output requests depending on the determined operating mode. As the number of free blocks included in a memory device decreases, the memory system (or memory device) may reach the high risk level or the block level; in this case, unexpected latencies may be consistently caused in the memory system. The memory system may decrease the host input/output request to GC processing ratio in a current time period compared to a previous time period such that the total number of free blocks is quickly secured. Accordingly, the consistent generation of the unexpected latencies may be prevented or reduced.

Figure 2:
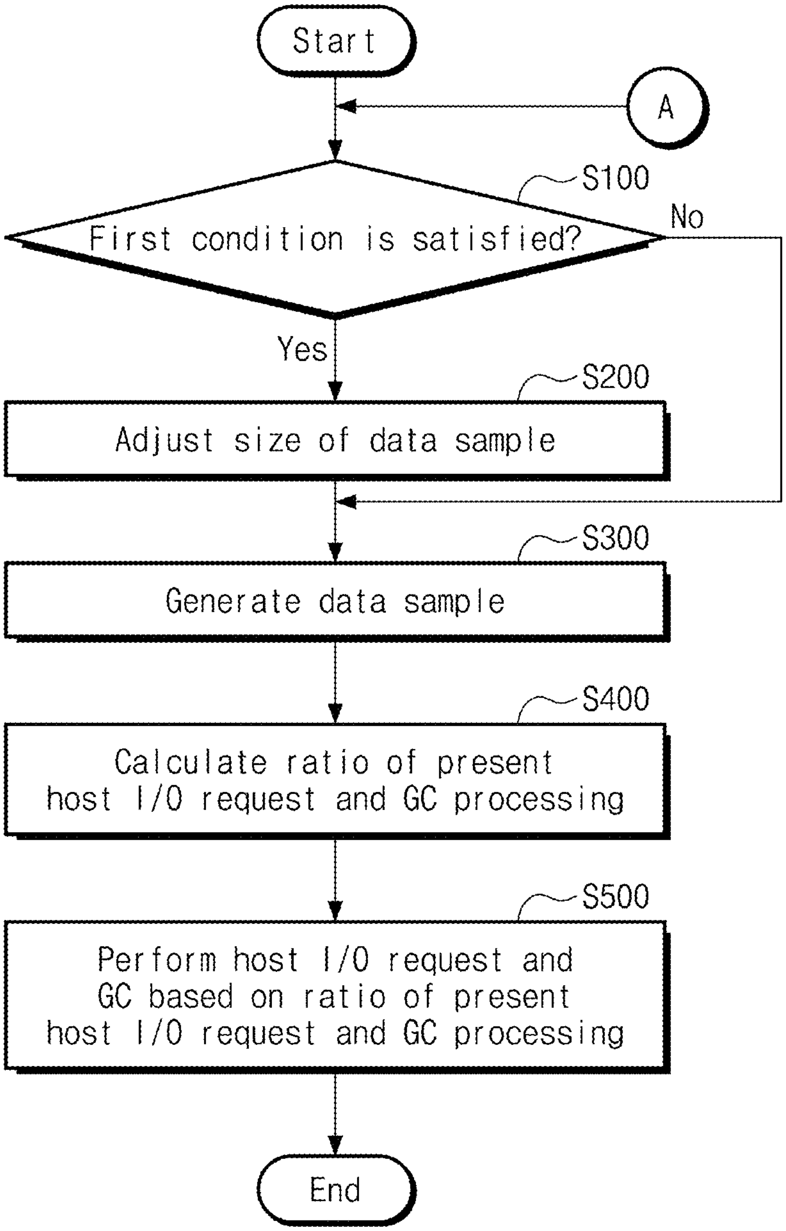
FIG. 2 is a flowchart illustrating an operating method of a memory system according to some example embodiments of the present disclosure.

FIG. 2 is a flowchart illustrating an operating method of a memory system according to some example embodiments of the present disclosure.

Referring to FIGS. 1 and 2, in the operating method of the memory system 100, whether there is satisfied a first condition associated with free blocks and GC target blocks among a plurality of memory blocks may be determined (S100).

When the first condition is satisfied (Yes in operation S100), the size of the data sample associated with executions of a host input/output request and GC may be adjusted (S200).

The data sample that includes a downscaled current valid page count (VPC) ratio for a current GC block among the GC target blocks and the first number of previous host input/output request to GC processing ratios may be generated based on the adjusted size of the data sample (S300).

In some example embodiment, when the first condition is not satisfied (No in operation S100), the first number may be smaller than the second number being the number of previous host input/output request to GC processing ratios included in the data sample and the size of the data sample may not be adjusted.

A current host input/output request to GC processing ratio may be calculated based on the data sample (S400).

The host input/output request and the GC may be performed based on the current host input/output request to GC processing ratio (S500).

In some example embodiments, when the first condition is not satisfied (No in operation S100), the method may directly proceed to operation S300 without performing operation S200. In this case, the data sample may include the second number of previous host input/output request to GC processing ratios, in which the second number is greater than the first number. In general, in the case of calculating the current host input/output request to GC processing ratio based on the data sample generated by performing both operation S200 and operation S300, the current host input/output request to GC processing ratio calculated based on the data sample generated by performing both operation S200 and operation S300 may be smaller than the current host input/output request to GC processing ratio calculated based on the data sample generated by performing operation S300, and a GC processing speed in a current time period may increase.

In some example embodiments, a point in time when operation S100 is again performed may be determined through a page connector "A". This will be described with reference to FIG. 12.

Figure 3:
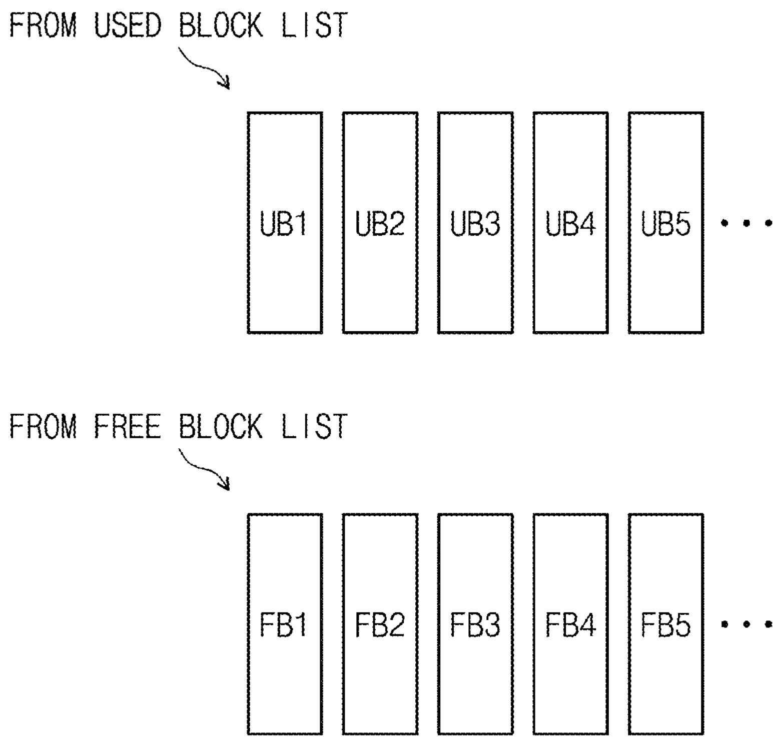
FIG. 3 is a diagram for describing free blocks and used blocks among a plurality of memory blocks included in a memory device of FIG. 1.

FIG. 3 is a diagram for describing free blocks and used blocks among a plurality of memory blocks included in a memory device of FIG. 1.

Referring to FIGS. 1 and 3, the memory device 130 may include a plurality of memory blocks, and the plurality of memory blocks may include used blocks UB1, UB2, UB3, UB4, UB5, etc. and free blocks FB1, FB2, FB3, FB4, FB5, etc.

The memory controller 110 may further include a block/page manager (e.g., 513 of FIG. 13) storing a used block list and a free block list, and the block/page manager may manage the used blocks UB1 to UB5 through the used block list and may manage the free blocks FB1 to FB5 through the free block list.

In some example embodiments, a free block may mean a memory block including only invalid pages or a memory block being in a state of being erased through the erase operation of the memory controller 110 such that new data are capable of being written therein. A used block may mean a memory block including one or more valid pages. The free blocks FB1 to FB5 may be targeted for processing of the host input/output requests HOST_I/Os corresponding to the write request of FIG. 1, and the used blocks UB1 to UB5 may be targeted for processing of the GC input/output requests GC_I/Os of FIG. 1. Memory blocks targeted for processing of the GC input/output requests GC_I/Os from among the used blocks UB1 to UB5 may be referred to as "GC target blocks".

Figure 4A:
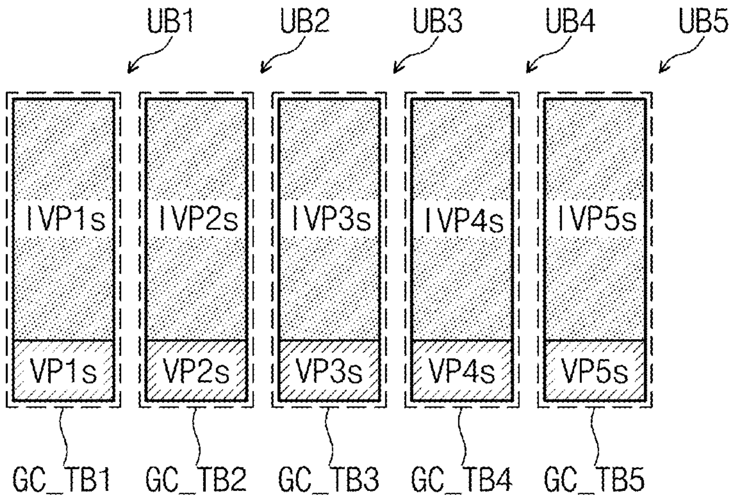
FIGS. 4A and 4B are diagrams for describing a valid page count (VPC) ratio and execution of a host input/output request and garbage collection (GC) based on a VPC ratio.
Figure 4B:
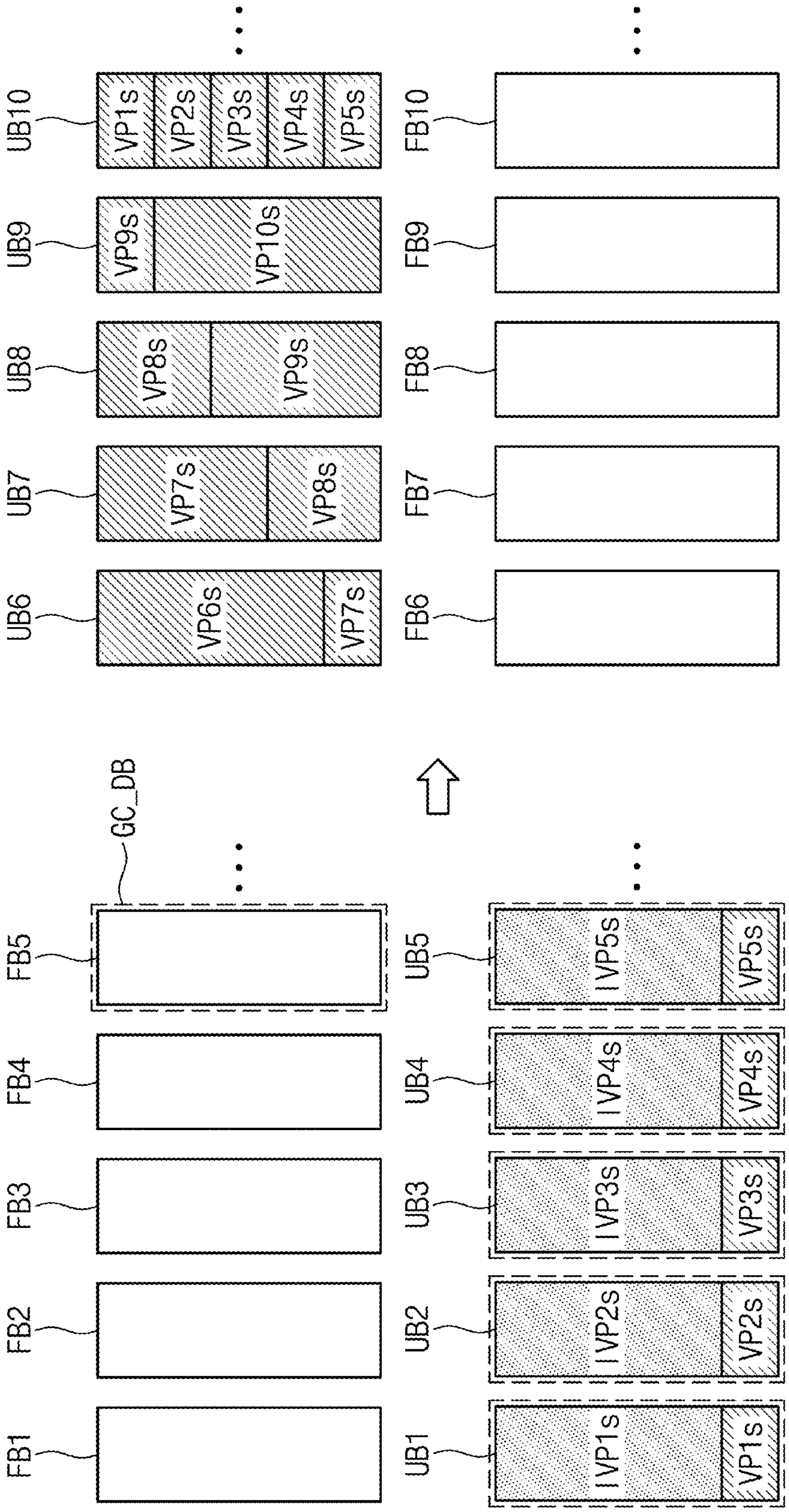

FIGS. 4A and 4B are diagrams for describing a valid page count (VPC) ratio and execution of a host input/output request and garbage collection (GC) based on a VPC ratio.

Referring to FIG. 4A, the used blocks UB1 to UB5 may be set to GC target blocks GC_TB1, GC_TB2, GC_TB3, GC_TB4, and GC_TB5. A memory block, which is under the GC, from among the GC target blocks GC_TB1 to GC_TB5 may be referred to as a "current GC block". For example, after the used block UB1 is set to the current GC block, the GC for the used block UB1 may be completed; then, after the used block UB2 is set to the current GC block, the GC for the used block UB2 may be performed. The GCs for the used blocks UB3, UB4, and UB5 may be performed in the above manner; each of the used blocks UB3, UB4, and UB5 may be set to the current GC block sequentially in the process of performing the corresponding GC.

In some example embodiments, the used block UB1 may include invalid pages IVP1s and valid pages VPIs, the used block UB2 may include invalid pages IVP2s and valid pages VP2s, and the used block UB3 may include invalid pages IVP3s and valid pages VP3s. The used block UB4 may include invalid pages IVP4s and valid pages VP4s, and the used block UB5 may include invalid pages IVP5s and valid pages VP5s.

In some example embodiments, in used blocks included in a memory device, as a ratio of invalid pages to valid pages increases, the probability that a used block is set to a GC target block may increase.

Referring to FIGS. 1, 3, 4A, and 4B, the memory device 130 may include a plurality of memory blocks, and the plurality of memory blocks may include the used blocks UB1 to UB5 and the free blocks FB1 to FB5. As described with reference to FIG. 4A, the used blocks UB1 to UB5 may be set to the GC target blocks GC_TB1 to GC_TB5, and the free block FB5 may be set to a GC destination block GC_DB associated with the execution of the GC.

In some example embodiments, valid pages VP6s, VP7s, VP8s, VP9s, and VP10s may be written in the free blocks FB1 to FB4 based on the host input/output requests HOST_I/Os of FIG. 1, and thus, the free blocks FB1 to FB4 may change to used blocks UB6, UB7, UB8, and UB9.

In some example embodiments, data of the valid pages VPIs to VP5s stored in the used blocks UB1 to UB5 may be written in the free block FB5 based on the GC input/output requests HOST_I/Os of FIG. 1, and thus, the free block FB5 may change to a used block UB10. In this case, the invalid pages IVP1s to IVP5s and the valid pages VP1s to VP 5s stored in the used blocks UB1 to UB5 may be physically or logically erased, and thus, the used blocks UB1 to UB5 may change to free blocks FB6, FB7, FB8, FB9, and FB10.

A VPC ratio may be defined with respect to a used block. In some example embodiments, the VPC ratio may indicate a ratio of the number of invalid pages to the number of valid pages in the used block. For example, the VPC ratio of the used block UB1 may indicate a ratio of the number of invalid pages IVPIs to the number of valid pages VP1s; the VPC ratio of the used block UB2 may indicate a ratio of the number of invalid pages IVP2s to the number of valid pages VP2s; similarly, the VPC ratio may be defined for each of the used blocks UB3 to UB5. In particular, the VPC ratio when a used block is set to the current GC block may be referred to as a "current VPC ratio".

In some example embodiments, the data sample associated with execution of a host input/output request and GC may be generated based on the current VPC ratio. For example, a downscaled current VPC ratio obtained by adjusting the current VPC ratio may be included in the data sample. A current host input/output request to GC processing ratio may be calculated based on the data sample. The host input/output requests HOST_I/Os and the GC input/output requests GC_I/Os may be performed during a specific time period, based on the current host input/output request to GC processing ratio.

Figures 5A, 5B:
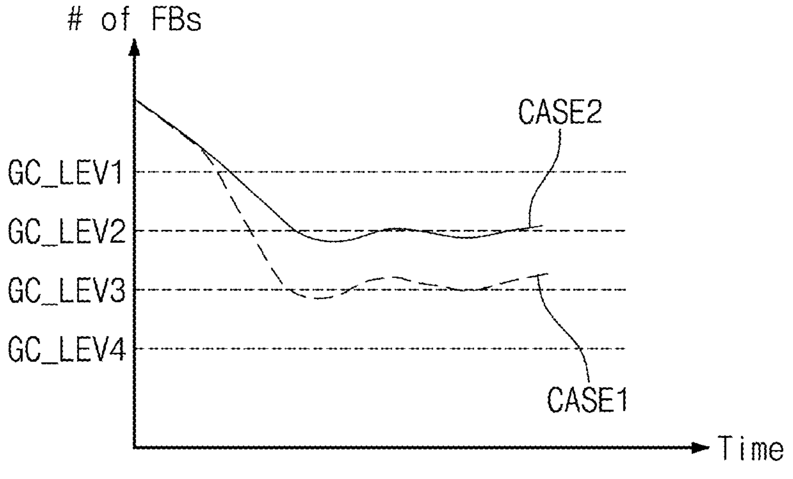
FIGS. 5A and 5B are diagrams for describing a plurality of GC levels.

FIGS. 5A and 5B are diagrams for describing a plurality of GC levels.

Referring to FIG. 5A, a plurality of GC levels may be defined depending on a change in the number of free blocks FBs. For example, when the number of free blocks is N1, the GC level may be defined as GC_LEV1; when the number of free blocks is N2, the GC level may be defined as GC_LEV2; when the number of free blocks is N3, the GC level may be defined as GC_LEV3; and, when the number of free blocks is N4, the GC level may be defined as GC_LEV4. In the numbers of free blocks N1 to N4, N1 may be the greatest, N4 may be the smallest, and the number of free blocks may sequentially decrease in descending order from greatest to smallest values: N1→N2→N3→N4.

In some example embodiments, the plurality of GC levels may include a "low risk level", a "target level", a "high risk level", and a "block level". For example, "GC_LEV1" may be the low risk level, and "GC_LEV2" may be the target level. "GC_LEV3" may be the high risk level, and "GC_LEV4" may be the block level.

The "high risk level" may indicate a level at which when the number of free blocks decreases below a given value, the free blocks should be secured by first performing GC input/output requests and then performing host input/output requests; the "block level" may indicate a level at which when the number of free blocks excessively decreases below the given value, the free blocks should be urgently secured by performing only the GC input/output requests GC_I/Os and blocking the host input/output requests HOST_I/Os. The "high risk level" and the "block level" may be defined based on the ratio of free blocks to all the memory blocks, as described with reference to FIG. 1.

Referring to FIGS. 5A and 5B, when the number of free blocks decreases and is then close to the high risk level or the block level before reaching the high risk level or the block level, a memory controller of a memory device may in advance change the size of the data sample for calculating the "host input/output request to GC processing ratio".

In some example embodiments, the target level may indicate the number of free blocks, which is used as a reference for changing the size of the data sample. For example, when the number of free blocks decreases to or below GC_LEV2 being the target level, the memory controller according to some example embodiments of the present disclosure may change the size of the data sample. As a result, unlike the case of changing no size of the data sample even though the number of free blocks decreases to the target level or less (CASE1), the number of free blocks included in a memory device may be prevented or reduced in likelihood from excessively decreasing below the "high risk level" or the "target level" and may be in advance prevented or reduced in likelihood from reaching the "high risk level" or the "block level" (CASE2). Accordingly, unexpected latencies may be prevented or reduced from being consistently caused.

Figure 6:
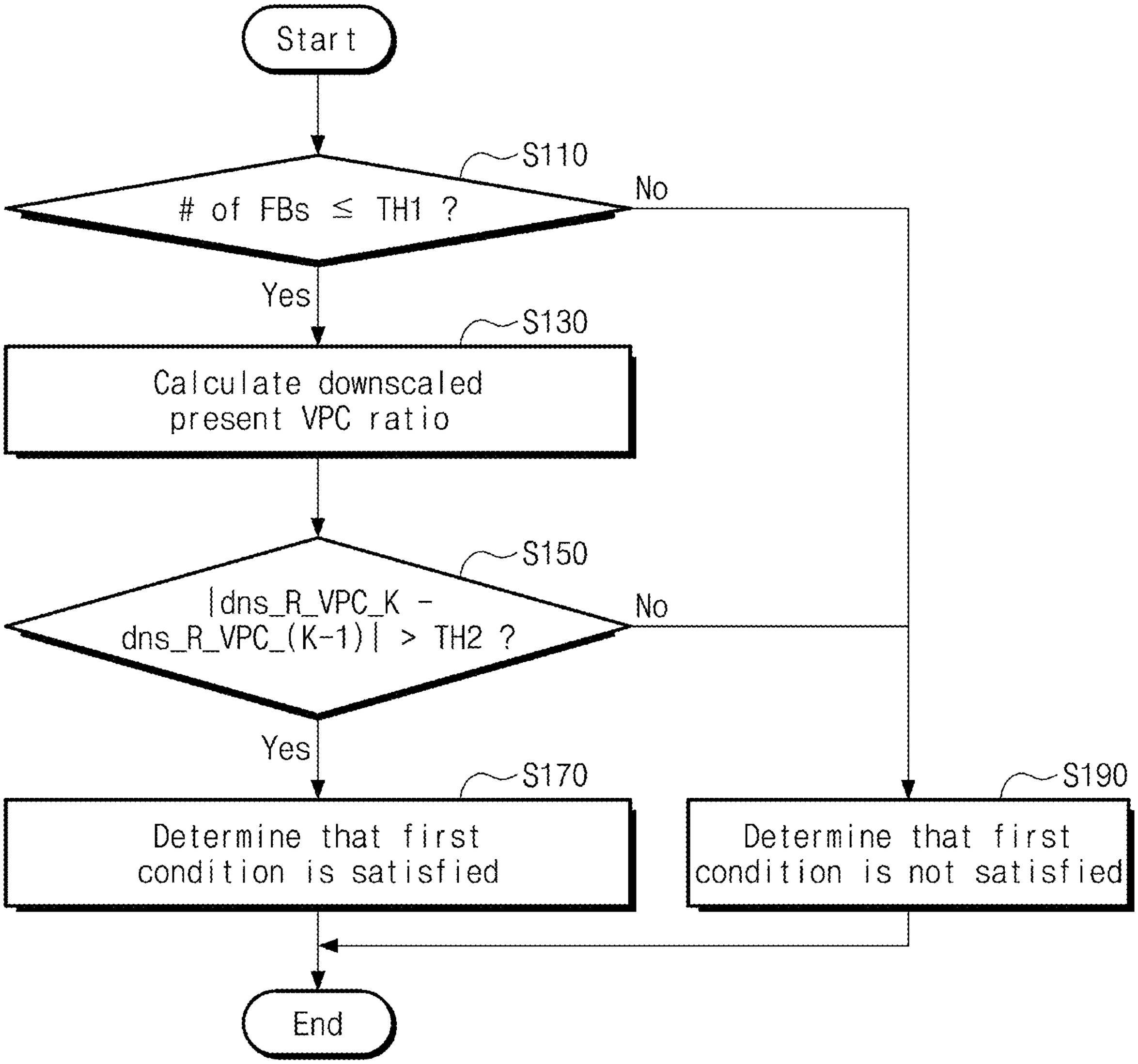
FIG. 6 is a flowchart illustrating some example embodiments of an operation of determining whether a first condition of FIG. 2 is satisfied.

FIG. 6 is a flowchart illustrating some example embodiments of an operation of determining whether a first condition of FIG. 2 is satisfied.

Referring to FIGS. 2 and 6, in operation S100 whether the first condition is satisfied is determined. Whether the first condition is satisfied is based on whether the number of free blocks FBs is smaller than or equal to a first threshold value TH1 (S110).

In some example embodiments, the number of free blocks FBs may be identified based on the free block list described with reference to FIG. 3.

When the number of free blocks FBs is smaller than or equal to the first threshold value TH1 (Yes in operation S110), a downscaled current VPC ratio may be calculated by adjusting a current VPC ratio of a current GC block among GC target blocks (S130).

In some example embodiments, the current GC block may refer to a memory block, which is under the GC, from among the GC target blocks.

In some example embodiments, the first threshold value TH1 may correspond to one of the plurality of GC levels described with reference to FIG. 5A. For example, the first threshold value TH1 may correspond to the target level of FIG. 5A, which is provided only as an example.

Whether a difference between the downscaled current VPC ratio and a downscaled previous VPC ratio is greater than a second threshold value TH2 may be determined (S150). For example, the second threshold value TH2 may be set to determine whether a sharp change at a current VPC ratio is made compared to a previous VPC ratio.

In some example embodiments, the current VPC ratio may correspond to a "current host input/output request to GC processing ratio", and the previous VPC ratio may correspond to a "previous host input/output request to GC processing ratio". Host input/output requests and GC input/output requests may be performed during a current time period (e.g., a first time period), based on the current host input/output request to GC processing ratio. Host input/ output requests and GC input/output requests may be performed during a previous time period (e.g., a second time period before the first time period), based on the previous host input/output request to GC processing ratio. While one or more GCs based on GC input/output requests are performed in the current time period and the previous time period, when a GC target block is changed, the previous VPC ratio may be calculated based on the change of the GC target block. However, this is provided only as an example.

In some example embodiments, the downscaled current VPC ratio and the downscaled previous VPC ratio may be calculated by adjusting the current VPC ratio and the previous VPC ratio at a given ratio. For example, the current VPC ratio and the previous VPC ratio may be adjusted based on a token refill frequency. However, this is provided only as an example. An average length of one time period corresponding to an "input/output request to GC processing ratio" may be adjusted based on the token refill frequency. For example, a maximum value of host tokens or GC tokens generated based on an input/output request to GC processing ratio may be determined by the token refill frequency. The token refill frequency will be described with reference to FIGS. 13 and 14.

When the number of free blocks FBs is smaller than or equal to the first threshold value TH1 (Yes in operation S110) and when the difference between the downscaled current VPC ratio and the downscaled previous VPC ratio is greater than the second threshold value TH2 (Yes in operation S150), it may be determined that the first condition is satisfied (S170).

When the number of free blocks FBs is greater than the first threshold value TH1 (No in greater S110) and when the difference between the downscaled current VPC ratio and the downscaled previous VPC ratio is smaller than the second threshold value TH2 (No in operation S150), it may be determined that the first condition is not satisfied (S190).

Figure 7:
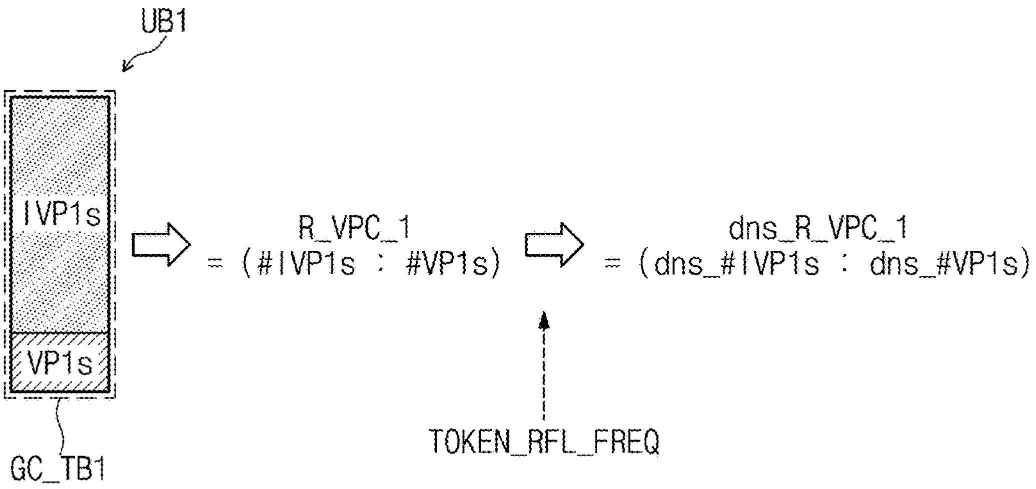
FIG. 7 is a diagram for describing some example embodiments of an operation of calculating a downscaled current VPC ratio by adjusting a current VPC ratio.

FIG. 7 is a diagram for describing some example embodiments of an operation of calculating a downscaled current VPC ratio by adjusting a current VPC ratio.

Referring to FIG. 7, a current VPC ratio R_VPC_1 may be calculated based on a GC target block GC_TB1. For example, the current VPC ratio R_VPC_1 may correspond to a "current host input/output request to GC processing ratio", and the GC may be performed on the used block UB1 based on the "current host input/output request to GC processing ratio".

In some example embodiments, the used block UB1 may include the invalid pages IVPIs and the valid pages VPIs. In this case, the current VPC ratio R_VPC_1 may be expressed by (#IVPIs:#VP1s) being a ratio of the invalid pages IVPIs to the valid pages VP1s. For example, the current VPC ratio R_VPC_1 may be expressed by a ratio of the number of invalid pages IVPIs to the number of valid pages VP1s.

In some example embodiment, a downscaled current VPC ratio dns_R_VPC_1 may be obtained by adjusting the current VPC ratio at a given ratio. For example, the current VPC ratio may be adjusted based on a token refill frequency TOKEN_RFL_FREQ. In this case, the downscaled current VPC ratio dns_R_VPC_1 may be expressed by (dns_#IVP1s:dns_#VP1s) being a result of downscaling (#IVP1s: #VP1s).

Figure 8:
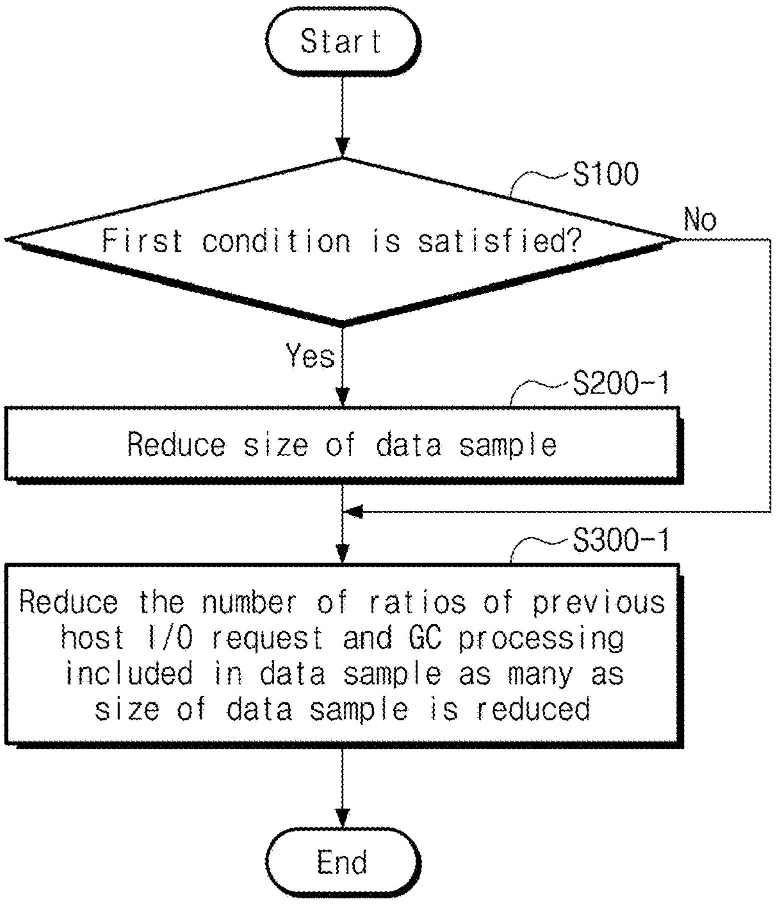
FIG. 8 is a flowchart illustrating some example embodiments of operations of adjusting a size of a data sample of FIG. 2 and generating a data sample.

FIG. 8 is a flowchart illustrating some example embodiments of operations of adjusting a size of a data sample of FIG. 2 and generating a data sample.

Referring to FIGS. 2 and 8, in operation S200 in which the size of the data sample is adjusted, the size of the data sample may be reduced (S200-1).

In operation S300 in which the data sample is generated, the number of previous host input/output request to GC processing ratios included in the data sample may be reduced as many as the size of the data sample is reduced (S300-1).

In some example embodiments, when the first condition is satisfied (Yes in operation S100), operation S200-1 and operation S300-1 may be performed; when the first condition is not satisfied (No in operation S100), only operation S300-1 may be performed.

In some example embodiments, when the first condition is satisfied (Yes in operation S100), the data sample including the first number of previous host input/output request to GC processing ratios may be generated; when the first condition is not satisfied (No in operation S100), the data sample including the second number of previous host input/output request to GC processing ratios may be generated. The first number may be smaller than the second number.

Figure 9:
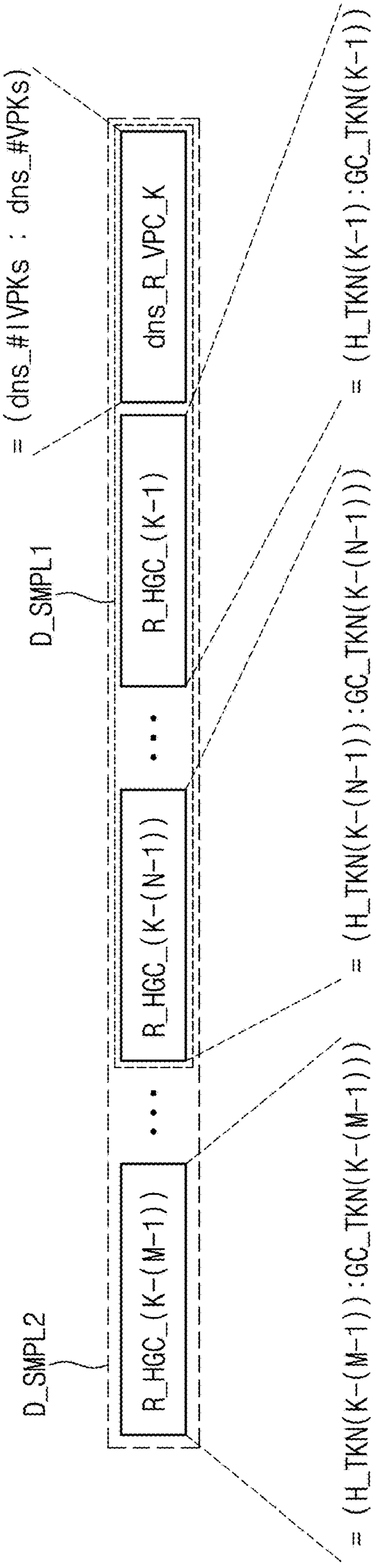
FIG. 9 is a diagram for describing some example embodiments of a data sample of FIG. 2.

FIG. 9 is a diagram for describing some example embodiments of a data sample of FIG. 2.

Data samples D_SMPL1 and D_SMPL2 are illustrated in FIG. 9; below, the description will be given with reference to FIGS. 2, 8, and 9.

The data sample D_SMPL1 may indicate a data sample corresponding to the case where the size of the data sample is adjusted in operation S200 when the first condition is satisfied (Yes in operation S100), and the data sample D_SMPL2 may indicate a data sample corresponding to the case where the size of the data sample is not adjusted in operation S200 when the first condition is not satisfied (No in operation S100).

In some example embodiments, the data sample D_SMPL1 may include a downscaled current VPC ratio dns_R_VPC_K and the first number of previous host input/output request to GC processing ratios R_HGC_(K−1), . . . , R_HGC_(K−(N−1)). The data sample D_SMPL2 may include the downscaled current VPC ratio dns_R_VPC_K and the second number of previous host input/output request to GC processing ratios R_HGC_(K−1), . . . , R_HGC_(K−(M−1). For example, the downscaled current VPC ratio dns_R_VPC_K may be expressed by (dns_#IVPKs:dns_#VPKs). In some example embodiments, "M", "N", and "K" are an integer of 1 or more, "M" is greater than "N", and "K" is greater than "M". However, the present disclosure is not limited thereto. For example, when the size of the data sample is "X" (X being an integer of 2 or more), the number of previous host input/output request to GC processing ratios included in the data sample may be (X−1).

In some example embodiments, "K" may correspond to a current time period, and (K−1), (K−(N−1)), and (K−(M−1)) may correspond to previous time periods before the current time period. (K−1) may indicate a time period immediately before the current time period, (K−2) may indicate a time period immediately before (K−1). Each of (K−(N−1)) and (K−(M−1)) may be understood as in the above description.

In some example embodiments, one host input/output request to GC processing ratio may be expressed by a ratio of one or more host tokens that are deducted one by one whenever one "host input/output request HOST_I/O" is performed to one or more GC tokens that are deducted one by one whenever one "GC input/output request GC_I/O" is performed. For example, a host input/output request to GC processing ratio R_HGC_(K−1) may be expressed by a ratio of host tokens H_TKN (K−1) to GC tokens GC_TKN (K−1); a host input/output request to GC processing ratio R_HGC_(K−(N−1)) may be expressed by a ratio of host tokens H_TKN (K−(N−1) to GC tokens GC_TKN (K−(N−

1)); a host input/output request to GC processing ratio R_HGC_(K−(M−1)) may be expressed by a ratio of host tokens H_TKN (K−(M−1)) to GC tokens GC_TKN (K−(M−1)).

In some example embodiments, one time period may be defined by a host input/output request to GC processing ratio. The "host input/output request HOST_I/O" and the "GC input/output request GC_I/O" described with reference to FIG. 1 may be performed based on one or more host tokens and one or more GC tokens expressed by the host input/output request to GC processing ratio. For example, one or more host tokens may be deducted one by one whenever one "host input/output request HOST_I/O" is performed, and one or more GC tokens may be deducted one by one whenever one "GC input/output request GC_I/O" is performed. The one or more host tokens and the one or more GC tokens may be generated based on the host input/output request to GC processing ratio, and one time period corresponding to the host input/output request to GC processing ratio may be defined as a time period from a point in time when the one or more host tokens and the one or more GC tokens are generated to a point in time when all the tokens are consumed.

Figure 10:
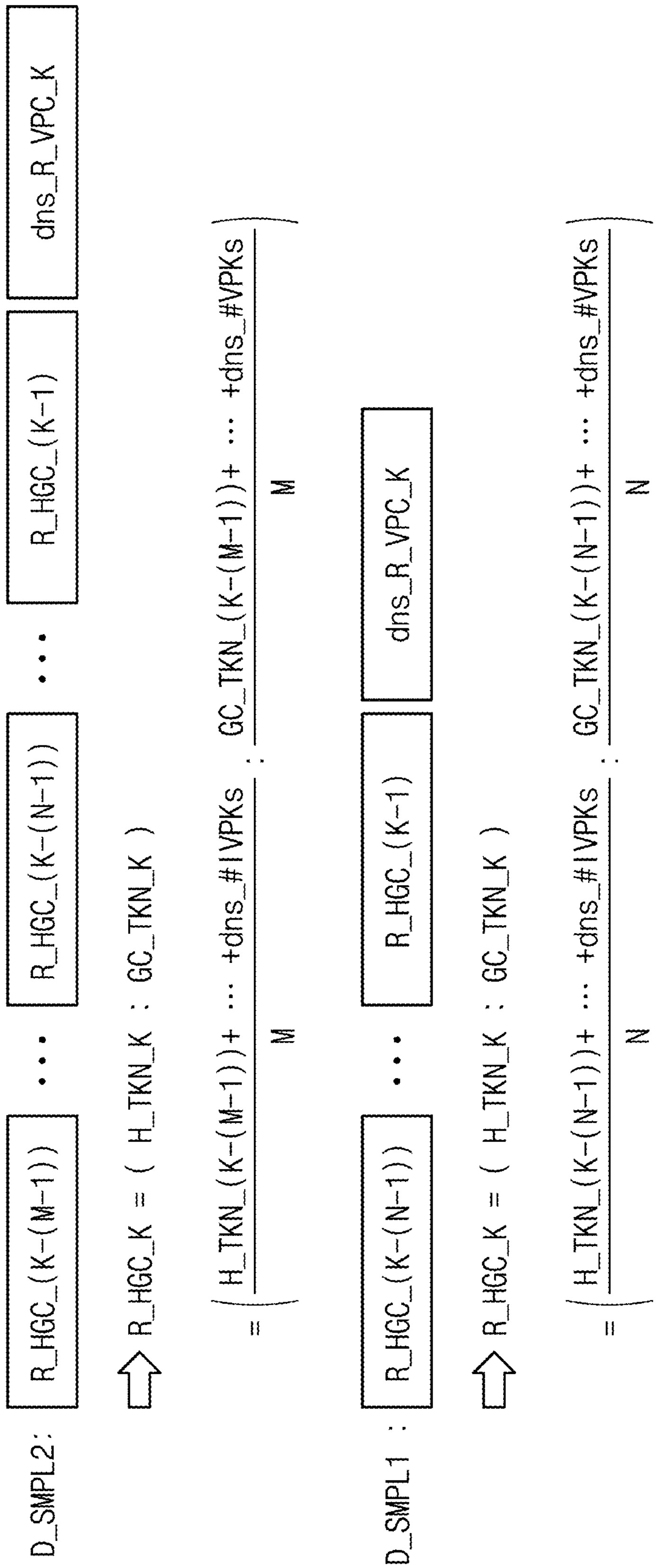
FIG. 10 is a diagram for describing some example embodiments of an operation of calculating a current host input/output request to GC processing ratio of FIG. 2.

FIG. 10 is a diagram for describing some example embodiments of an operation of calculating a current host input/output request to GC processing ratio of FIG. 2.

Referring to FIGS. 2, 9, and 10, the current host input/output request to GC processing ratio R_HGC_K may be generated based on the data sample D_SMPL1, and the current host input/output request to GC processing ratio R_HGC_K may be generated based on the data sample D_SMPL2. For example, when the first condition described with reference to FIGS. 1 and 2 is satisfied, the current host input/output request to GC processing ratio R_HGC_K may be generated based on the data sample D_SMPL1; when the first condition is not satisfied, the current host input/output request to GC processing ratio R_HGC_K may be generated based on the data sample D_SMPL2.

In some example embodiments, the data sample D_SMPL1 may include the downscaled current VPC ratio dns_R_VPC_K and the first number of previous host input/output request to GC processing ratios R_HGC_(K−1), . . . , R_HGC_(K−(N−1)). The data sample D_SMPL2 may include the downscaled current VPC ratio dns_R_VPC_K and the second number of previous host input/output request to GC processing ratios R_HGC_(K−1), . . . , R_HGC_(K−(M−1)).

In some example embodiments, the current host input/output request to GC processing ratio R_HGC_K may be expressed by one or more host tokens H_TKN_K and one or more GC tokens GC_TKN_K.

For example, when "R_HGC_K" is calculated based on the data sample D_SMPL1, "H_TKN_K" may be determined as a value obtained by adding "dns_#IVPKs" and the host tokens H_TKN_(K−1), . . . , H_TKN_(K−(N−1)) and dividing the sum by "M". "GC_TKN_K" may be determined as a value obtained by adding "dns #VPKs" and the GC tokens GC_TKN_(K−1), . . . , GC_TKN_(K−(N−1)) and dividing an addition result by "N". In some example embodiments, "dns #IVPKs" may be the downscaled number of invalid pages corresponding to a time period "K", the host tokens H_TKN_(K−1), . . . , H_TKN_(K−(N−1)) may be host tokens respectively corresponding to time periods (K−1) to (K−(N−1)), and the GC tokens GC_TKN_(K−1), . . . , GC_TKN_(K−(N−1)) may be GC tokens respectively corresponding to time periods (K−1) to (K−(N−1)).

For example, when "R_HGC_K" is calculated based on the data sample D_SMPL2, "H_TKN_K" may be determined as a value obtained by adding "dns_#IVPKs" and the host tokens H_TKN_(K−1), . . . , H_TKN_(K−(M−1)) and dividing the sum by "M". "GC_TKN_K" may be determined as a value obtained by adding "dns_#VPKs" and the GC tokens GC_TKN_(K−1), . . . , GC_TKN_(K−(M−1)) and dividing an addition result by "M". In some example embodiments, "dns_#IVPKs" may be the downscaled number of invalid pages corresponding to the time period "K", the host tokens H_TKN_(K−1), . . . , H_TKN_(K−(M−1)) may be host tokens respectively corresponding to the time periods (K−1) to (K−(M−1)), and the GC tokens GC_TKN_(K−1), . . . , GC_TKN_(K−(M−1)) may be GC tokens respectively corresponding to the time periods (K−1) to (K−(M−1)).

Figure 11:
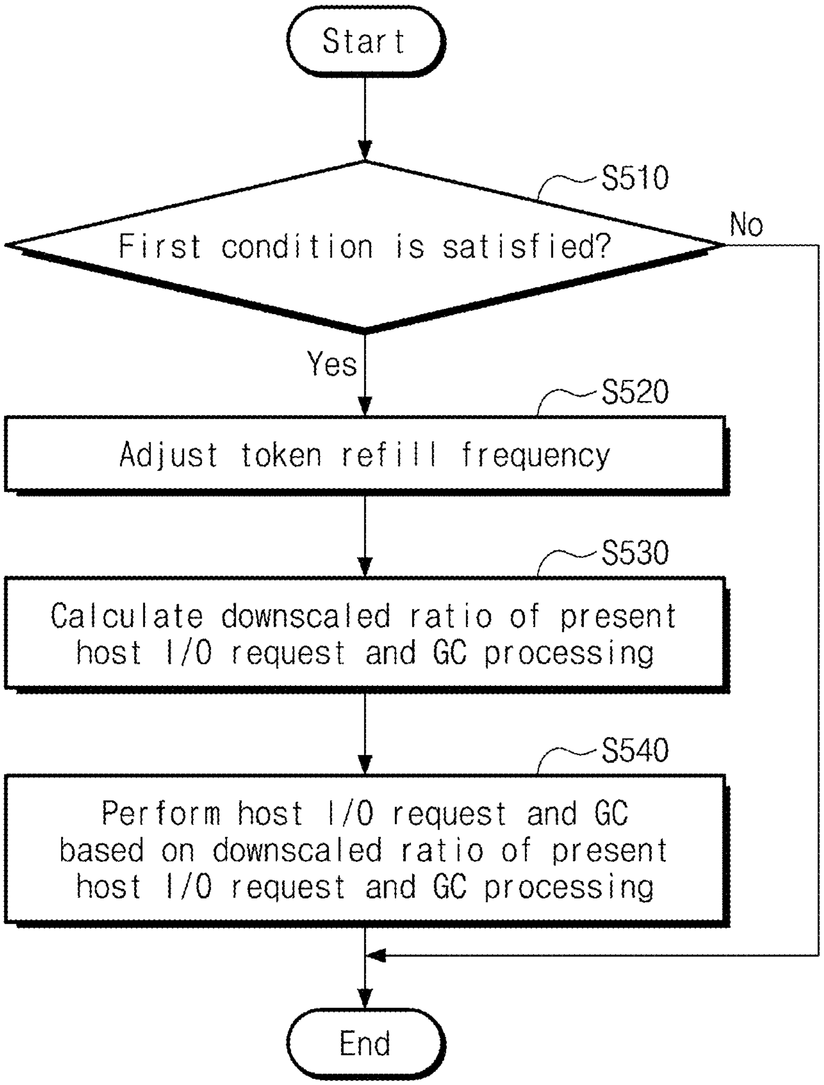
FIGS. 11 and 12 are flowcharts illustrating some example embodiments of an operation of performing a host input/output request and GC of FIG. 2.
Figure 12:
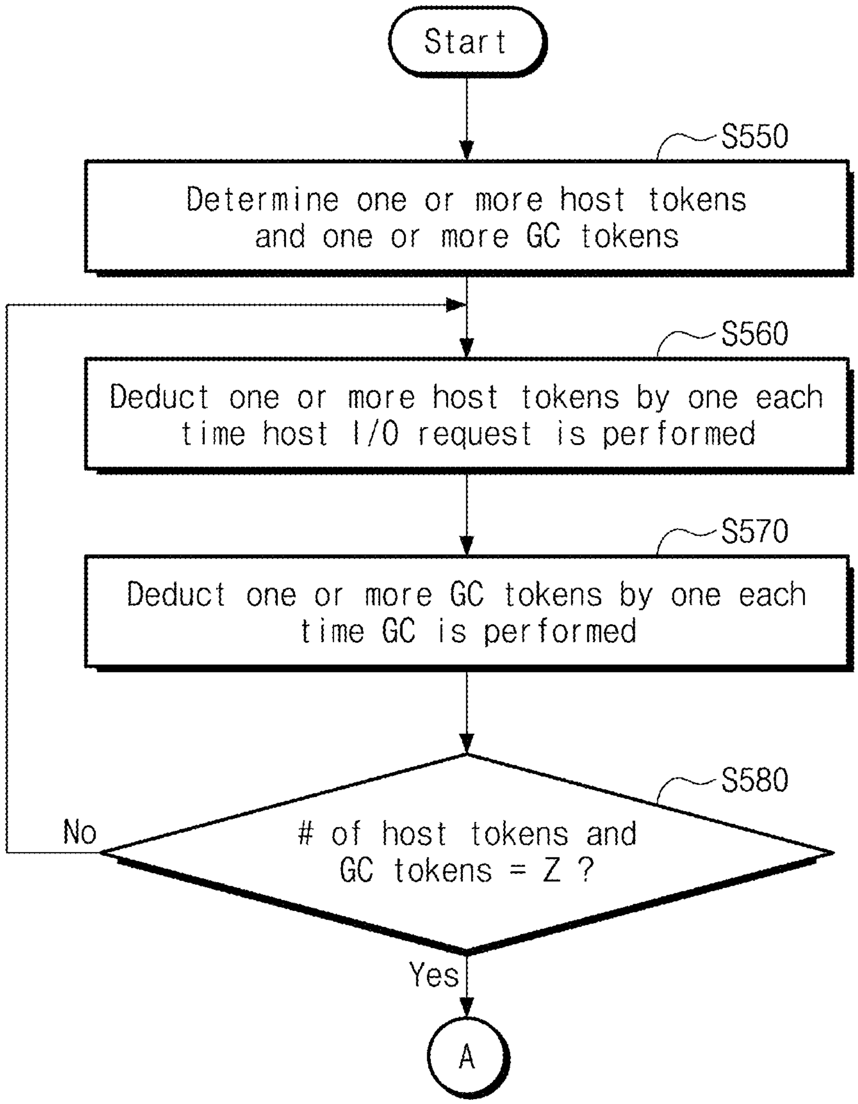

FIGS. 11 and 12 are flowcharts illustrating some example embodiments of an operation of performing a host input/output request and GC of FIG. 2.

Referring to FIGS. 2 and 11, in operation S500 in which a host input/output request and GC are performed, when the first condition is satisfied (Yes in operation S510), a token refill frequency may be adjusted (S520).

In some example embodiments, as the token refill frequency decreases, a length of one time period defined by a host input/output request to GC processing ratio may decrease. As the length of the time period decreases, a memory system according to some example embodiments of the present disclosure may operate to be sensitive to a change in the number of free blocks of a memory device.

A downscaled current host input/output request to GC processing ratio may be calculated by adjusting the current host input/output request to GC processing ratio based on the adjusted token refill frequency (S530).

One or more commands for performing the host input/output request and the GC may be issued based on the downscaled current host input/output request to GC processing ratio, instead of the current host input/output request to GC processing ratio (S540).

In some example embodiments, when the first condition is satisfied (Yes in operation S510), the current host input/output request to GC processing ratio may be downscaled in addition to the adjustment of the size of the data sample described with reference to FIG. 2.

Referring to FIGS. 1, 11, and 12, in operation S500 in which the host input/output request and the GC are performed, the one or more downscaled host tokens and the one or more downscaled GC tokens may be determined (S550).

The one or more downscaled host tokens may be deducted one by one whenever the host input/output request is performed (S560).

The one or more downscaled GC tokens may be deducted one by one whenever the GC is performed (S570).

Before all of the one or more downscaled host tokens and the one or more downscaled GC tokens are deducted, whether the first condition is satisfied may again be determined (in the case of Yes in operation S580, move to operation S100 of FIG. 2 through the page connector "A").

In some example embodiments, when the number of the one or more downscaled host tokens and the one or more downscaled GC tokens is "Z" (Z being an integer of 0 or more), the method may proceed to operation S100; when the number of the one or more downscaled host tokens and the one or more downscaled GC tokens is greater than "Z" (Z being an integer of 0 or more), operation S560 and operation S570 may be performed.

In some example embodiments, the host input/output request and the GC may be performed based on the downscaled current host input/output request to GC processing ratio until all of the one or more downscaled host tokens and the one or more downscaled GC tokens are deducted.

Figure 13:
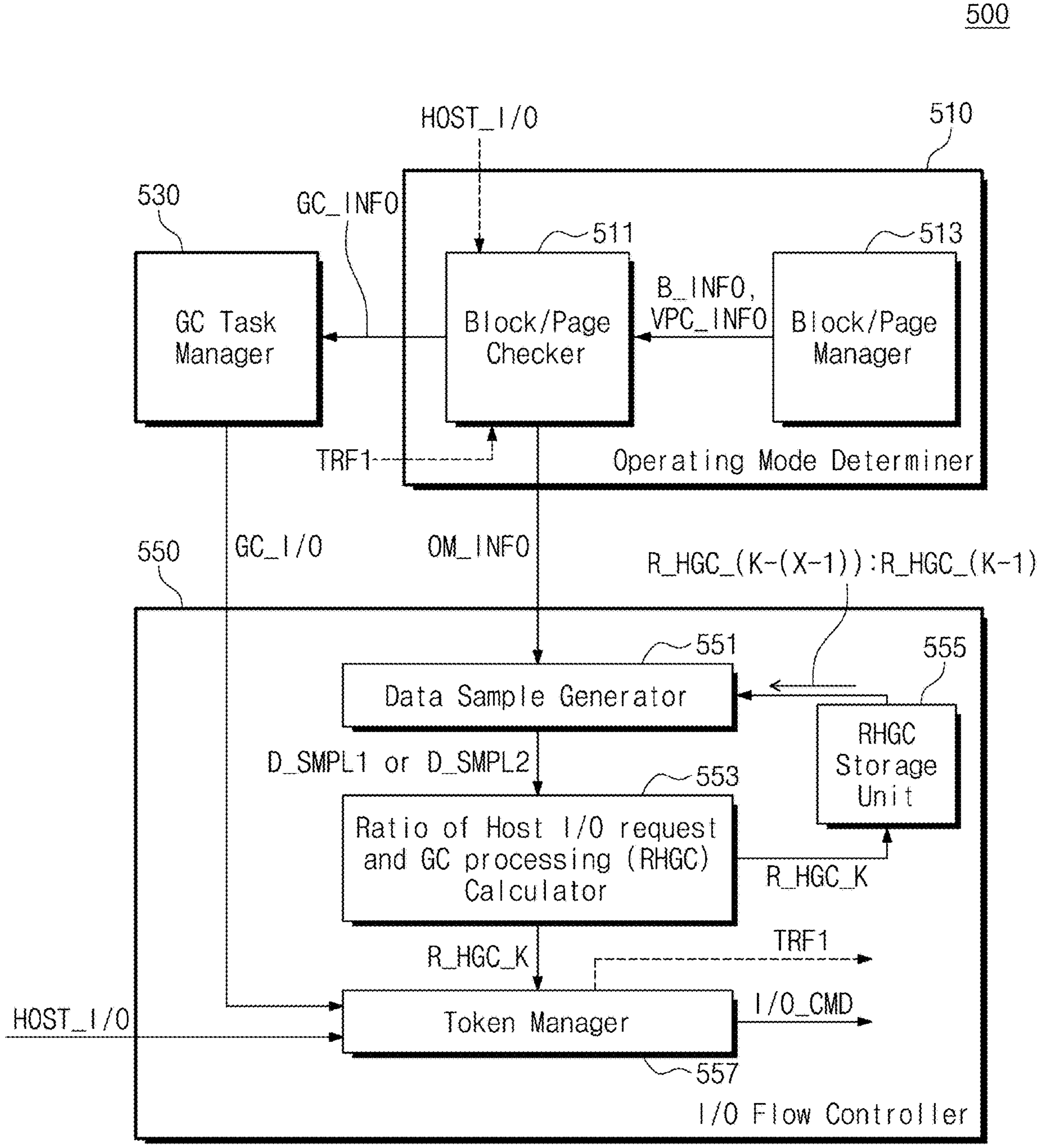
FIG. 13 is a block diagram illustrating some example embodiments of a memory controller of FIG. 1.

FIG. 13 is a block diagram illustrating some example embodiments of a memory controller of FIG. 1.

Referring to FIGS. 1 and 13, a memory controller 500 may correspond to the memory controller 110 of FIG. 1.

The memory controller 500 may include an operating mode determiner 510, a GC task manager 530, and an input/output flow controller 550.

The operating mode determiner 510 may include a block/page checker 511 and a block/page manager 513, and the input/output flow controller 550 may include a data sample generator 551, a ratio of host input/output request to GC processing (RHGC) calculator 553, an RHGC storage unit 555, and a token manager 557.

The operating mode determiner 510 may determine whether the first condition is satisfied. When the first condition is satisfied, the operating mode determiner 510 may adjust the size of the data sample; when the first condition is not satisfied, the operating mode determiner 510 may not adjust the size of the data sample.

The block/page manager 513 may store the used block list and the free block list described with reference to FIG. 3 and may store the current VPC ratio and the previous VPC ratio described with reference to FIGS. 1, 2, and 6. The block/page manager 513 may provide the block/page checker 511 with block information B_INFO including the used block list and the free block list and VPC information VPC_INFO including the current VPC ratio and the previous VPC ratio.

The block/page checker 511 may determine whether the first condition is satisfied and may determine the size of the data sample for calculating a host input/output request to GC processing ratio based on a result of the determination.

In some example embodiments, the block/page checker 511 may adjust the size of the data sample when the first condition is satisfied and may not adjust the size of the data sample when the first condition is not satisfied.

In some example embodiments, the block/page checker 511 may output the operating mode information OM_INFO indicating one of the first operating mode and the second operating mode to the input/output flow controller 550 and may output the GC information GC_INFO to the GC task manager 530. The operating mode information OM_INFO may include the size of the data sample and a downscaled current VPC ratio, and the GC information GC_INFO may include addresses of GC target blocks and pieces of information related to GC executions.

In some example embodiments, the block/page checker 511 may determine whether the first condition is satisfied, based on the host input/output request HOST_I/O. For example, when the host input/output request HOST_I/O is a write request, the block/page checker 511 may determine whether the first condition is satisfied.

In some example embodiments, the block/page checker 511 may receive a token refill frequency TRF1 corresponding to a current host input/output request to GC processing ratio from the token manager 557 and may generate the downscaled current VPC ratio by adjusting the current VPC ratio based on the token refill frequency TRF1.

The GC task manager 530 may output, to the input/output flow controller 550, the GC input/output request GC_I/O for performing the GC when the first condition is satisfied.

The input/output flow controller 550 may generate the data sample based on the size of the data sample received in the OM_INFO, may calculate the current host input/output request to GC processing ratio based on the data sample, and may issue the command I/O_CMD for performing the host input/output request HOST_I/O and the GC input/output request GC_I/O based on the current host input/output request to GC processing ratio.

The data sample generator 551 may receive the operating mode information OM_INFO from the block/page checker 511, may receive previous host I/O request to GC processing ratios (e.g., R_HGC_(K−(X−1):R_HGC_(K−1)) corresponding to the size of the data sample from the RHGC storage unit 555, and may generate a data sample (e.g., D_SMPL1 or D_SMPL2) based on the current VPC ratio included in the operating mode information OM_INFO and the previous host I/O request to GC processing ratios.

The RHGC calculator 553 may output the current host input/output request to GC processing ratio R_HGC_K to the token manager 557 and the RHGC storage unit 555 based on the data sample from the data sample generator 551.

The token manager 557 may generate one or more host tokens and one or more GC tokens based on the current host input/output request to GC processing ratio R_HGC_K. The token manager 557 may receive the host input/output request HOST_I/O and the GC input/output request GC_I/O, may deduct the one or more host tokens one by one whenever the host input/output request HOST_I/O is performed, and may deduct the one or more GC tokens one by one whenever the GC input/output request GC_I/O is performed. The token manager 557 may issue the command I/O_CMD for performing the host input/output request HOST_I/O and the GC input/output request GC_I/O based on the current host input/output request to GC processing ratio R_HGC_K. In this case, the command I/O_CMD may be included in commands that the memory controller 500 issues to a memory device.

In some example embodiments, the token manager 557 may generate the token refill frequency TRF1 so as to be output to the block/page checker 511.

Figure 14:
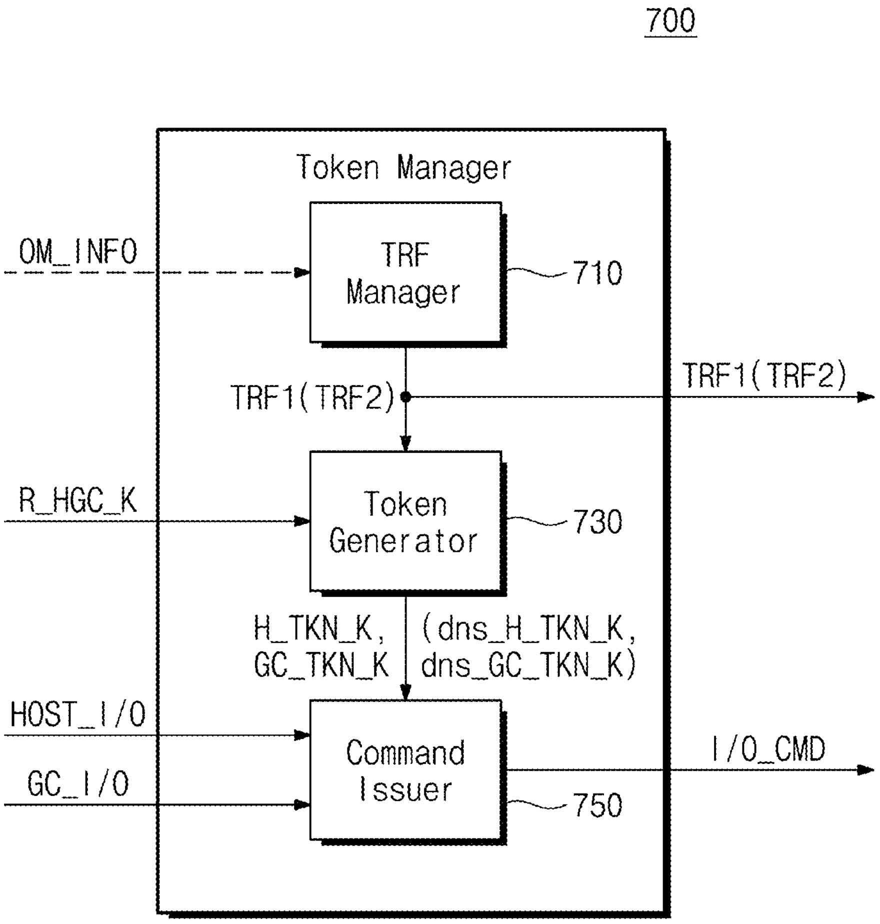
FIG. 14 is a block diagram illustrating some example embodiments of a token manager of FIG. 13.

FIG. 14 is a block diagram illustrating in some example embodiments of a token manager of FIG. 13.

Referring to FIGS. 13 and 14, a token manager 700 may correspond to the token manager 557 of FIG. 13.

The token manager 700 may include a token refill frequency (TRF) manager 710, a token generator 730, and a command issuer 750.

The TRF manager 710 may output the token refill frequency TRF1 to the token generator 730 or the block/page checker 511.

The token generator 730 may generate the host tokens H_TKN_K and the GC tokens GC_TKN_K based on the "current host input/output request to GC processing ratio" R_HGC_K and the token refill frequency TRF1 and may output the host tokens H_TKN_K and the GC tokens GC_TKN_K to the command issuer 750.

The command issuer 750 may receive the host tokens H_TKN_K and the GC tokens GC_TKN_K and may output the host input/output request HOST_I/O and the GC input/output request GC_I/O as the command I/O_CMD based on the host tokens H_TKN_K and the GC tokens GC_TKN_K.

In some example embodiments, the TRF manager 710 may further receive the operating mode information OM_INFO from the block/page checker 511 and may generate a token refill frequency TRF2 whose value is smaller than that of the token refill frequency TRF1, based on the operating mode information OM_INFO. For example, the token refill frequency TRF2 may be generated by adjusting the token refill frequency TRF1 in operation S520 described with reference to FIG. 11. In this case, the token refill frequency TRF2 may be transferred to the token generator 730 and/or the block/page checker 511, and the block/page checker 511 may generate the downscaled current VPC ratio by adjusting the current VPC ratio based on the token refill frequency TRF2. The token generator 730 may generate the downscaled host tokens dns_H_TKN_K and the downscaled GC tokens GC_TKN_K based on the token refill frequency TRF2 (operation S540 and operation S550 of FIGS. 11 and 12).

Figure 15:
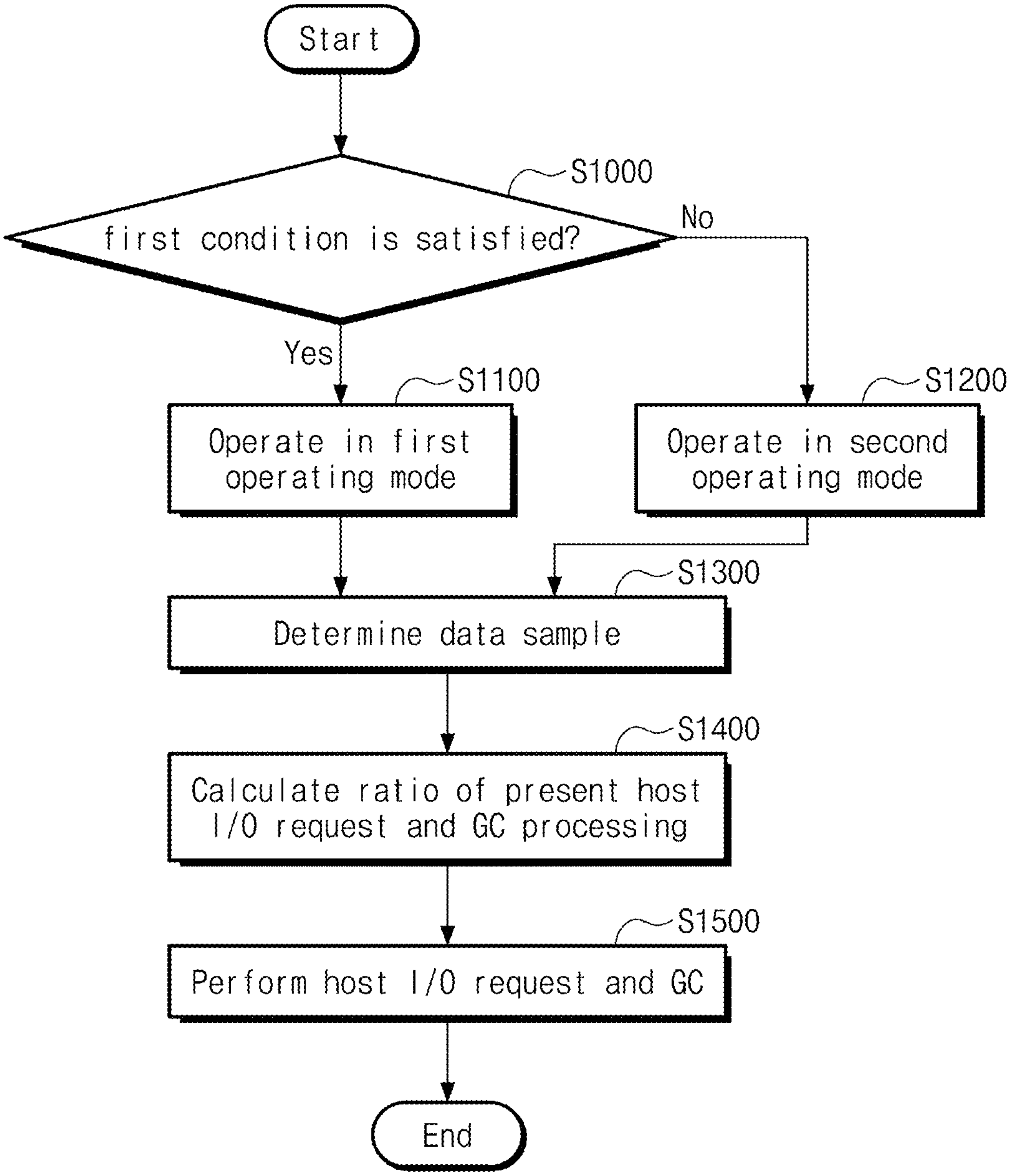
FIG. 15 is a flowchart illustrating an operating method of a memory system according to some example embodiments of the present disclosure.

FIG. 15 is a flowchart illustrating an operating method of a memory system according to some example embodiments of the present disclosure.

Referring to FIG. 15, in the operating method of the memory system, whether there is satisfied the first condition associated with free blocks and GC target blocks among a plurality of memory blocks may be determined (S1000).

When the first condition is satisfied (Yes in operation S1000), the memory system may operate in a first operating mode (S1100); when the first condition is not satisfied (No in operation S1000), the memory system may operate in a second operating mode (S1200).

A data sample may be determined in one of the first operating mode and the second operating mode (S1300). In the first operating mode, the data sample may include a downscaled current VPC ratio and the first number of previous host input/output request to GC processing ratios; in the second operating mode, the data sample may include the downscaled current VPC ratio and the second number of previous host input/output request to GC processing ratios.

A current host input/output request to GC processing ratio may be calculated based on the data sample (S1400). The host input/output request and the GC may be performed based the current host input/output request to GC processing ratio (S1500).

In some example embodiments, operation S1000, operation S1300, operation S1400, and operation S1500 may respectively correspond to operation S100, operation S300, operation S400, and operation S500 of FIG. 2.

Figure 16:
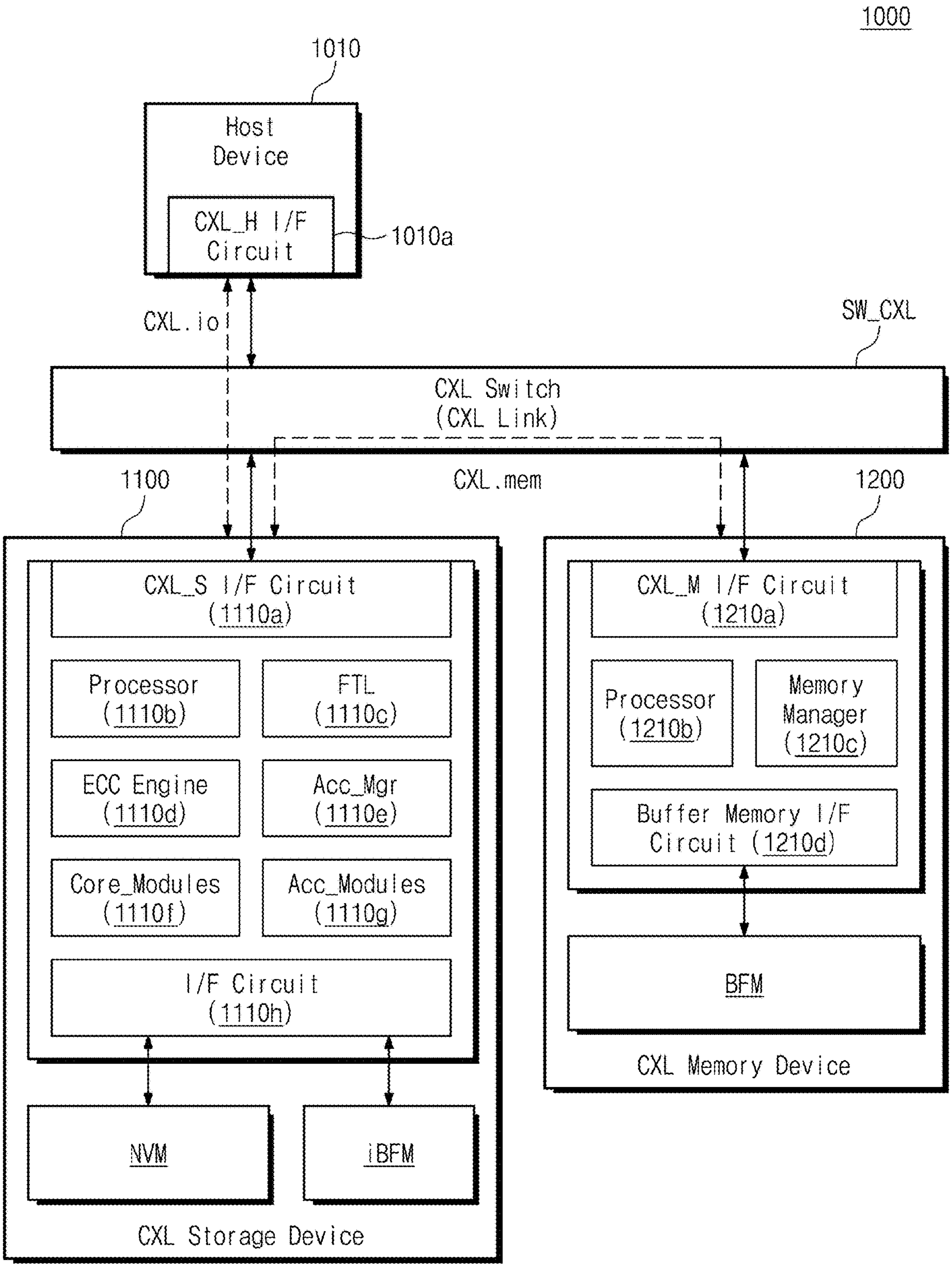
FIG. 16 is a block diagram illustrating an electronic system including a memory system according to some example embodiments of the present disclosure.

FIG. 16 is a block diagram illustrating an electronic system including a memory system according to some example embodiments of the present disclosure.

Referring to FIG. 16, an electronic system 1000 may include a host device 1010, a compute express link (CXL) storage device 1100, and a CXL memory device 1200 that communicate through a CXL switch SW_CXL. The host device 1010 and the CXL storage device 1100 may respectively correspond to the host device 200 and the memory system 100 of FIG. 1.

The CXL switch SW_CXL may be a component included in a CXL interface. For example, the CXL interface may perform functions of a host interface, a buffer memory interface, and a nonvolatile memory interface.

The host device 1010 may include a CXL host interface circuit 1010*a*. The CXL host interface circuit 1010*a* may communicate with the CXL storage device 1100 or the CXL memory device 1200 through the CXL switch SW_CXL.

The CXL storage device 1100 may include a CXL storage interface circuit 1110*a*, a processor 1110*b*, an FTL 1110*c*, an ECC engine 1110*d*, an acceleration module manager 1110*e*, a core module 1110*f*, an acceleration module 1110*g*, a nonvolatile memory interface circuit 1110*h*, a nonvolatile memory NVM, and an internal buffer memory iBFM. In some example embodiments, the nonvolatile memory NVM may include a plurality of nonvolatile memory blocks. For example, the plurality of nonvolatile memory blocks may include a plurality of nonvolatile memory cells. For example, the CXL storage device 1100 may be a NAND flash memory device, but the present concept is not limited thereto.

The components 1110*a*, 1110*b*, 1110*c*, 1110*d*, 1110*e*, 1110*f*, 1110*g*, and 1110*h* included in the CXL storage device 1100 may constitute a "CXL storage controller", and the CXL storage controller may correspond to a memory controller (e.g., 110 of FIG. 1).

In some example embodiments, under control of the host device 1010, the CXL storage controller may store data in the nonvolatile memory NVM or may transmit data present in the nonvolatile memory NVM to the host device 1010. For example, the nonvolatile memory NVM may be a NAND flash memory, but the present disclosure is not limited thereto.

In some example embodiments, the internal buffer memory iBFM may temporarily store data that are input to the CXL storage controller or are output from the CXL storage controller. For example, the internal buffer memory iBFM may correspond to a block/page manager (e.g., 513 of FIG. 13).

The CXL memory device 1200 may include a CXL memory interface circuit 1210*a*, a processor 1210*b*, a memory manager 1210*c*, a buffer memory interface circuit 1210*d*, and a buffer memory BFM. The components 1210*a*, 1210*b*, 1210*c*, and 1210*d* included in the CXL memory device 1200 may constitute a "CXL memory controller", and the CXL memory controller may correspond to a memory controller (e.g., 110 of FIG. 1).

In some example embodiments, under control of the host device 1010, the CXL memory device 1200 may store data in the buffer memory BFM or may send data stored in the buffer memory BFM to the host device 1010. For example, the CXL memory device 1200 may store monitoring data associated with the CXL storage device 1100 in the buffer memory BFM and may transmit the monitoring data to the host device 1010 periodically or non-periodically. For example, the buffer memory BFM may be a DRAM, but the present disclosure is not limited thereto.

In some example embodiments, the host device 1010, the CXL storage device 1100, and the CXL memory device 1200 may be configured to share the same interface. For example, the host device 1010, the CXL storage device 1100, and the CXL memory device 1200 may communicate with each other through the CXL switch SW_CXL. The CXL switch SW_CXL may refer to a low-latency and high-bandwidth link that supports coherency, memory access, and dynamic protocol muxing of IO protocols such that various connections between accelerators, memory devices, or various electronic devices are possible.

Figure 17:
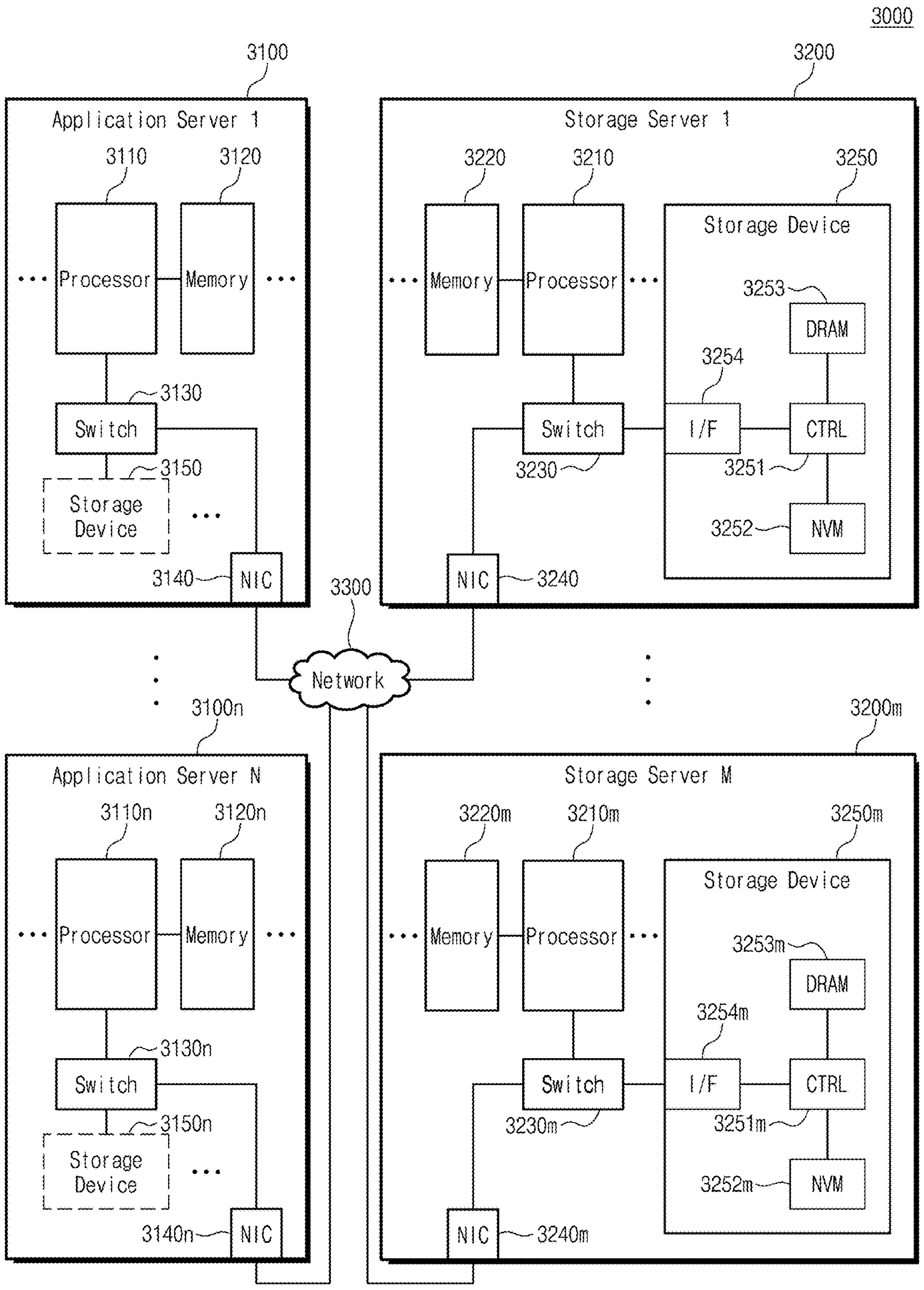
FIG. 17 is a block diagram illustrating a data center including a memory system according to some example embodiments of the present disclosure.

FIG. 17 is a diagram illustrating a data center including the memory system according to some example embodiments of the present disclosure.

Referring to FIG. 17, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to some example embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In some example embodiments, the processor 3210 and the memory 3220 may provide a processor-memory pair. In some example embodiments, the number of processors 3210 may be different from the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to some example embodiments.

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In some example embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another example embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network Inter-Connect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and/or a host bus interface and be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230, and the storage device 3250. The application server 3100 may include a NIC 3140 that is substantially the same as the NIC 3240.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In some example embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor **3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250** may include a secure element (SE) for security or privacy.

Each of the storage devices 3250, . . . , **3250*n* may include the memory system according to some example embodiments of the present disclosure. Accordingly, each of the storage devices 3250, . . . , 3250*n* may determine an operating mode of each of the storage devices 3250, . . . , 3250*n* depending on whether there is satisfied a specific condition associated with free blocks and GC target blocks and may change a token refill frequency or the size of a data sample for calculating a "host input/output request to GC processing ratio" associated with the number of times of processing (or a processing speed) of host input/output requests and GC input/output requests depending on the determined operating mode. As the number of free blocks reaches a high risk level or a block level, unexpected latencies may be consistently caused in each of the storage devices 3250, . . . , 3250*n*; in this case, each of the storage devices 3250, . . . , 3250*n*** may reduce the "host input/output request to GC processing ratio" such that the total number of free blocks are quickly secured. Accordingly, it may be possible to prevent or reduce unexpected latencies from being consistently caused.

According to some example embodiments of the present disclosure, a memory system may determine an operating mode of the memory system depending on whether there is satisfied a specific condition associated with free blocks and GC target blocks and may change a token refill frequency or the size of a data sample for calculating a "host input/output request to GC processing ratio" associated with the number of times of processing (or a processing speed) of host input/output requests and GC input/output requests depending on the determined operating mode. As the number of free blocks reaches a high risk level or a block level, unexpected latencies may be consistently caused in the memory system; in this case, the memory system may reduce the "host input/output request to GC processing ratio" such that the total number of free blocks is quickly secured. Accordingly, it may be possible to prevent or reduce unexpected latencies from being consistently caused.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the present disclosure has been described with reference to some example embodiments thereof, it will be apparent to those of ordinary skill in the art that various changes and modifications may be made thereto without departing from the spirit and scope of the present disclosure as set forth in the following claims. Furthermore, example embodiments are not necessarily mutually exclusive with one another. For example, some example embodiments may include one or more features described with reference to one or more figures, and may also include one or more other features described with reference to one or more other figures.

What is claimed is:

1. A method of operating a storage system, the method comprising:

determining a first garbage collection (GC) level among a plurality of GC levels based on a level of decrease of free blocks among a plurality of memory blocks;

reducing a size of a data sample associated with executions of host input/output requests and GC input/output requests to generate a first data sample having the reduced size, based on the first GC level; and performing the host input/output requests and the GC input/output requests, based on the first data sample.

2. The method of claim 1, wherein the first GC level represents that a number of the free blocks has decreased below a given value.

3. The method of claim 1, wherein the first GC level represents that a ratio of the free blocks to the plurality of memory blocks decreases below a given ratio.

4. The method of claim 1, wherein the plurality of GC levels include:

a high-risk level indicating when a number or a ratio of the free blocks decreases below a given number or a given ratio; and a block level indicating when the number or the ratio of the free blocks excessively decreases below the given number or the given ratio.

5. The method of claim 4, wherein the performing the host input/output requests and the GC input/output requests includes:

performing the GC input/output requests first and then the host input/output requests, based on the first GC level being the high-risk level.

6. The method of claim 4, wherein the performing the host input/output requests and the GC input/output requests includes:

performing the GC input/output requests only and blocking the host input/output requests, based on the first GC level being the block level.

7. The method of claim 1, wherein the size of the data sample is associated with an acquisition speed for acquiring new free blocks.

8. The method of claim 7, wherein the new free blocks are acquired faster as the size of the data sample decreases.

9. The method of claim 1, wherein the first data sample includes:

a downscaled current valid page count (VPC) ratio for a current GC block among GC target blocks and a first number of previous host input/output request and GC processing ratios.

10. The method of claim 9, further comprising:

determining a second GC level among the plurality of GC levels;

maintaining the size of the data sample to generate a second data sample having the maintained size, based on the second GC level; and performing the host input/output requests and the GC input/output requests, based on the second data sample, wherein the second data sample includes the downscaled current VPC ratio and a second number of previous host input/output requests and GC processing ratios, and wherein the second number is greater than the first number.

11. A method of operating a memory device, the method comprising:

determining a first garbage collection (GC) level among a plurality of GC levels based on a level of decrease of free blocks among a plurality of memory blocks;

adjusting a size of a data sample associated with executions of host input/output requests and GC input/output requests to generate the data sample having the adjusted size, based on the first GC level; and performing the host input/output requests and the GC input/output request, based on the data sample.

12. The method of claim 11, wherein the determining the first GC level includes:

detecting the level of decrease by determining whether a number or a ratio of the free blocks decreases below a given number or a given ratio; and identifying the first GC level, based on the level of decrease.

13. The method of claim 11, wherein the generating the data sample having the adjusted size includes:

adjusting the data sample to have a first size, based on the first GC level being a high-risk level; and adjusting the data sample to have a second size that is smaller than the first size, based on the first GC level being a block level.

14. The method of claim 13, wherein:

the high-risk level indicating when a number or a ratio of the free blocks decreases below a given number or a given ratio; and the block level indicating when the number or the ratio of the free blocks excessively decreases below the given number or the given ratio.

15. The method of claim 11, wherein the size of the data sample is associated with an acquisition speed for acquiring new free blocks.

16. A method of operating a memory controller, the method comprising:

detecting a level of decrease of free blocks among a plurality of memory blocks;

determining a first garbage collection (GC) level among a plurality of GC levels, based on the level of decrease;

adjusting a data sample associated with executions of host input/output requests and GC input/output requests to generate the data samples having the adjusted size, based on the first GC level; and issuing the host input/output requests and the GC input/output request to a memory device, based on the data sample.

17. The method of claim 16, wherein the first GC level indicates when a number or a ratio of the free blocks decreases below a given number or a given ratio.

18. The method of claim 16, wherein the new free blocks are acquired faster as the size of the data sample decreases.

19. The method of claim 16, wherein the issuing the host input/output requests and the GC input/output requests to the memory device includes:

calculating a downscaled current host input/output request to GC processing ratio, based on the data sample; and generating the host input/output requests and the GC input/output requests, based on the downscaled current host input/output request to GC processing ratio.

20. The method of claim 19, wherein the issuing the host input/output requests and the GC input/output requests to the memory device further includes:

determining one or more downscaled host tokens and one or more downscaled GC tokens, based on the downscaled current host input/output request to GC processing ratio;

deducting the one or more downscaled host tokens one by one whenever the host input/output request is performed; and deducting the one or more downscaled GC tokens one by one whenever the GC is performed.

* * * * *